US012802100B2

(12) United States Patent
Bodzo et al.

(10) Patent No.: US 12,802,100 B2

(45) **Date of Patent: *Nov. 17, 2026**

(54) METHODS AND APPARATUS FOR WIRELESS COMMUNICATION WITH AN AUDIENCE MEASUREMENT DEVICE

(71) Applicant: The Nielsen Company (US), LLC, New York, NY (US)

(72) Inventors: Stephen Jess Bodzo, Tampa, FL (US); Marko Panger, Plavje (SI); Timothy Scott Cooper, Tarpon Springs, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/799,214

(22) Filed: Aug. 9, 2024

(65) Prior Publication Data

US 2024/0403915 A1 Dec. 5, 2024

Related U.S. Application Data

(63) Continuation of application No. 18/472,392, filed on Sep. 22, 2023, now Pat. No. 12,073,434, which is a (Continued)

(51) Int. Cl.

*G06Q 30/02* (2023.01)
*G06Q 30/0201* (2023.01)
*G06Q 30/0251* (2023.01)

(52) U.S. Cl.

CPC ..... *G06Q 30/0255* (2013.01); *G06Q 30/0201* (2013.01)

(58) Field of Classification Search

CPC ....................... G06Q 30/0255; G06Q 30/0201
See application file for complete search history.

(56) References Cited

U.S. PATENT DOCUMENTS

2007/0162927 A1* 7/2007 Ramaswamy ....... H04N 21/235 725/32
2013/0312019 A1* 11/2013 McMillan ........ H04N 21/42203 725/14

(Continued)

OTHER PUBLICATIONS

"A Survey of Approaches for the Visual Model-Driven Development of Next Generation Software-Intensive Systems" (Giese et al., Elsevier Ltd., Journal of Visual Languages and Computing 17, 2006, 23 pages) (Year: 2006).*

*Primary Examiner* — James M Detweiler

(57) ABSTRACT

Methods, apparatus, systems, and articles of manufacture for communication with an audience metering device are disclosed. An example apparatus includes one or more non-transitory computer readable media, instructions in the apparatus, and one or more processors to execute the instructions. The example one or more processors are to segment a message to be transmitted to a configuration device into a first message segment and a second message segment, store the first message segment in a characteristic memory, and transmit a first advertisement to the configuration device when the first message segment is stored in the characteristic memory. Additionally, the example one or more processors are to after the first message segment has been gathered by the configuration device, store the second message segment in the characteristic memory and transmit a second advertisement to the configuration device when the second message segment is stored in the characteristic memory.

20 Claims, 15 Drawing Sheets

Related U.S. Application Data continuation of application No. 18/331,442, filed on Jun. 8, 2023, now Pat. No. 11,798,030, which is a continuation of application No. 17/397,769, filed on Aug. 9, 2021, now Pat. No. 11,704,695, which is a continuation of application No. 15/192,683, filed on Jun. 24, 2016, now Pat. No. 11,087,358.

(56) References Cited

U.S. PATENT DOCUMENTS

| | | | | |
|---|---|---|---|---|
| 2014/0065967 | A1* | 3/2014 | Shen | H04W 88/04<br>455/41.2 |
| 2014/0257053 | A1* | 9/2014 | Yuen | A61B 5/0002<br>600/301 |
| 2015/0055553 | A1* | 2/2015 | Liang | H04L 67/125<br>370/328 |
| 2015/0244807 | A1* | 8/2015 | Shoemake | H04N 21/42203<br>709/202 |
| 2016/0164725 | A1* | 6/2016 | Wu | H04L 12/40<br>370/257 |
| 2016/0295410 | A1* | 10/2016 | Gupta | H04W 12/06 |
| 2016/0374120 | A1* | 12/2016 | Logue | H04W 4/06 |
| 2017/0041304 | A1* | 2/2017 | Tal | H04L 63/062 |

* cited by examiner

METHODS AND APPARATUS FOR WIRELESS COMMUNICATION WITH AN AUDIENCE MEASUREMENT DEVICE

CROSS-REFERENCE TO RELATED APPLICATIONS

This disclosure is a continuation of U.S. patent application Ser. No. 18/472,392, filed Sep. 22, 2023, issued as U.S. Pat. No. 12,073,434, which is a continuation of U.S. patent application Ser. No. 18/331,442, filed Jun. 8, 2023, issued as U.S. Pat. No. 11,798,030, which is a continuation of U.S. patent application Ser. No. 17/397,769, filed Aug. 9, 2021, issued as U.S. Pat. No. 11,704,695, which is a continuation of U.S. patent application Ser. No. 15/192,683, filed Jun. 24, 2016, issued as U.S. Pat. No. 11,087,358, each of which is hereby incorporated by reference in its entirety.

FIELD OF THE DISCLOSURE

This disclosure relates generally to wireless communication, and, more particularly, to methods and apparatus for wireless communication with an audience measurement device.

BACKGROUND

Monitoring companies desire knowledge on how users interact with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Traditionally, audience measurement entities (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

Figure 1:
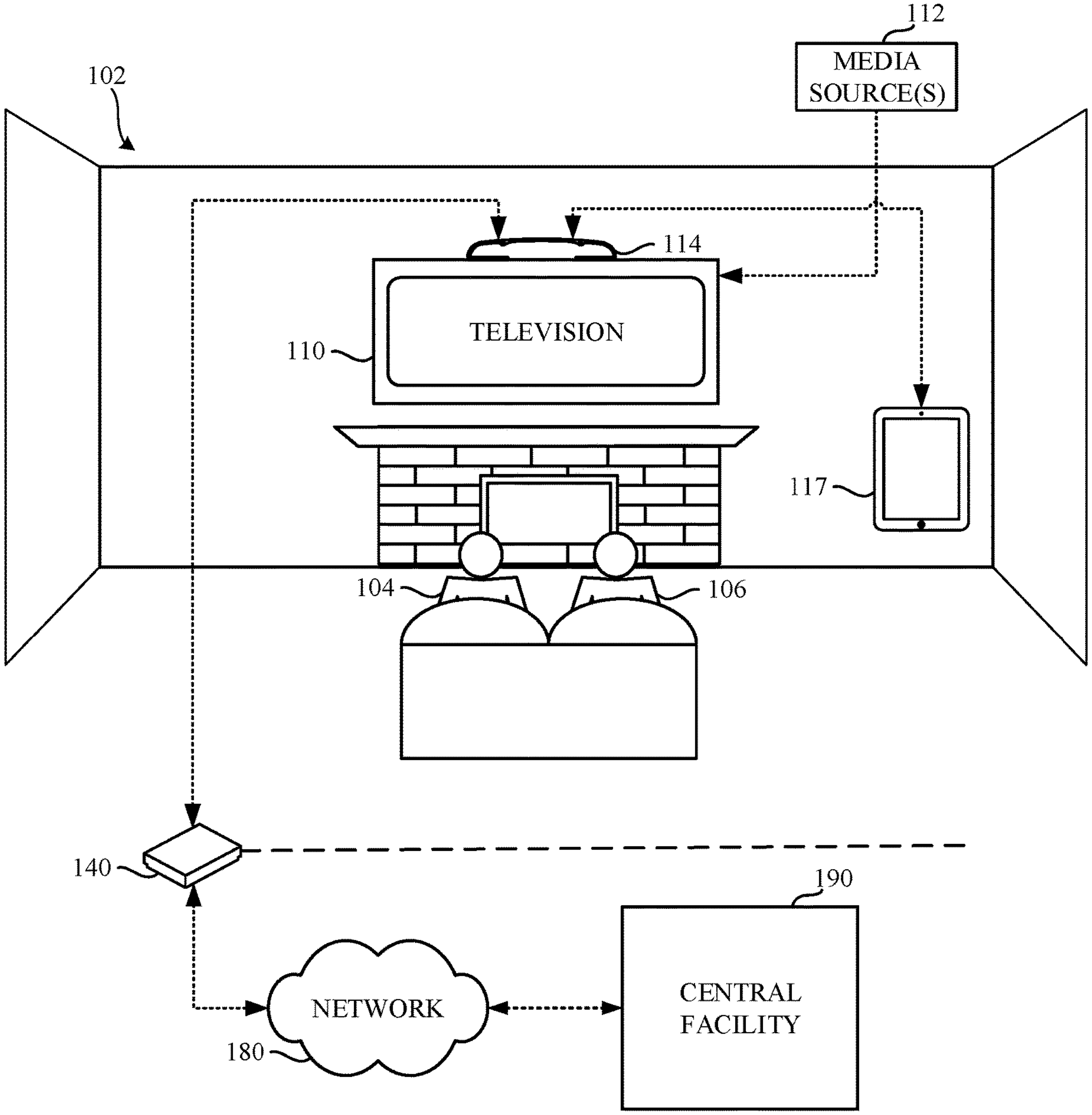
FIG. 1 is a block diagram of an example system constructed in accordance with the teachings of this disclosure for wireless communication with an audience measurement device.

FIG. 1 is an illustration of an example audience measurement system constructed in accordance with the teachings of this disclosure to perform symbol based watermark detection. In the illustrated example of FIG. 1, an example media presentation environment 102 includes example panelists 104, 106, an example media presentation device 110 that receives media from an example media source 112, an example meter 114, and an example configuration device 117. The meter 114 identifies the media presented by the media presentation device 110 and reports media monitoring information to an example central facility 190 of an example audience measurement entity via an example gateway 140 and an example network 180. To facilitate communication of the meter 114 with the example gateway 140, the example configuration device 117 provides configuration information to the meter such as, for example, a name of a wireless network hosted by the example gateway 140, credentials for accessing the wireless network hosted by the example gateway 140, etc.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In the illustrated example of FIG. 1, the media presentation device 110 is in communication with an audio/video receiver 118. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed in the media presentation environment 102. In some examples, the meter 114 is installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, configuring the meter 114 to transmit media monitoring information via the example gateway 140, etc. In examples disclosed herein, configuration of the meter 114 is performed by an installer (e.g., personnel from the audience measurement entity) who installs the meter 114 in the media presentation environment 102 and configures the meter 114.

The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media.

In examples disclosed herein, to monitor media presented by the media presentation device 110, the meter 114 of the illustrated example senses audio (e.g., acoustic signals or ambient audio) output (e.g., emitted) by the media presentation device 110 and/or some other audio presenting system (e.g., an audio/video receiver). For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes an example audio sensor (e.g., a microphone). In some examples, the meter 114 may process audio signals obtained from the media presentation device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be compiled with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

In examples disclosed herein, the example meter 114 is configured using an example configuration device 117. The configuration device 117 of the illustrated example of FIG. 1 is implemented by a mobile device (e.g., a smartphone, an Apple iPad, etc.). However, any other type of device may additionally or alternatively be used. In examples disclosed herein, the configuration device 117 communicates with the meter 114 using a Bluetooth Low Energy (BLE) protocol. However, any other protocol may additionally or alternatively be used. The BLE protocol (sometimes also referred to as Bluetooth LE, or Bluetooth Smart) is a wireless protocol that facilitates device operation at reduced power levels compared to traditional Bluetooth protocols. The BLE protocol is typically used when devices are to communicate small quantities of information at relatively infrequent transmission intervals. that does not need to be monitored at a high frequency (e.g., ten times per second or less) such as, for example, a heart rate, a temperature, a sensor reading, etc.

The BLE protocol does not natively support streaming large amounts of information such as, for example, serial information representing a terminal session, instructions to be executed, etc. The BLE protocol utilizes a characteristic to transmit data values between devices. A characteristic is a data element which is stored at a server device and can be read and/or written to by a client device. Memory that stores the characteristic is sometimes referred to as a characteristic memory. In examples disclosed herein, the meter 114 functions as the server device and provides data stored in the characteristic memory to the configuration device 117 (which functions as the client device), and/or may write information received from the configuration to the characteristic memory. However, any other arrangement may additionally or alternatively be used. For example, the meter 114 may function as the client device, and the configuration device 117 may function as the server device. In some other examples, the meter 114 may function as the client device to a device other than the configuration device 117 such as, for example, another device that may report, supply, and/or communicate information and/or data to and/or from the meter 114.

In examples disclosed herein, the configuration device 117 is provided by the audience measurement entity to an installer (e.g., a person affiliated with the audience measurement entity and tasked with installing and/or configuring the meter 114, one of the panelists 104, 106, etc.). However, in some examples, the example configuration device 117 may be implemented by an application installed on a device (e.g., an application, which is sometimes referred to as an "app", etc.).

In the illustrated example of FIG. 1, the example configuration device 117 uses a first BLE characteristic to transmit an instruction to the meter 114, a second BLE characteristic to receive one or more messages in response to the instruction from the meter 114, and a third BLE characteristic to receive one or more other event messages (e.g., messages that were not in response to the instruction) from the meter 114. However, any other configuration may additionally or alternatively be used. In examples disclosed herein, the instruction may be any instruction to facilitate configuration of the meter such as, for example, an instruction to configure the meter to communicate using a WiFi network provided by the example gateway 140, an instruction to store one or more panelist identifiers in a memory of the meter 114, an instruction to use a specified combination of audio sensors (e.g., microphones) to monitor for media, etc. The instruction may then be executed by the meter 114, and a response to the instruction (e.g., a message and/or output caused as a result of execution of the instruction) may then be transmitted to the configuration device 117 for display to a user.

Using configuration information (e.g., a name of a WiFi network, credentials for accessing the WiFi network, etc.) received from the configuration device (e.g., via an instruction to be executed at the meter 114), the meter 114 of the illustrated example communicates with a remotely located central facility 190 of the audience measurement entity. In the illustrated example of FIG. 1, the example meter 114 communicates with the central facility 190 via a gateway 140 and a network 180. The example metering device 114 of FIG. 1 sends media identification data and/or audience identification data to the central facility 190 periodically, a-periodically and/or upon request by the central facility 190.

The example gateway 140 of the illustrated example of FIG. 1 is a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc., to transmit and/or receive data via the Internet. Alternatively, the gateway 140 may be coupled to such a LAN. In examples disclosed herein, the example gateway 140 and/or connectivity to the Internet via the gateway 140 is provided by the panelists 104, 106. That is, the example gateway 140 is a device that is owned and/or operated by the panelists 104, 106, and is not provided by the audience measurement entity. In some examples, the example gateway 140 may be provided by an Internet Service Provider (ISP) to facilitate communication between the LAN provided by the gateway 140 and the network 180 (e.g., the Internet). In examples disclosed herein, the meter 114 utilizes the LAN hosted by the example gateway 140 to transmit information to the central facility 190. Transmitting information using a LAN provided by the example gateway 140 ensures that information is reliably transmitted to the central facility 190. Advantageously, other costlier approaches to transmitting information to the central facility 190 such as, for example, inclusion of a cellular transceiver in the meter 114, need not be utilized.

The network 180 of the illustrated example is a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation such as, for example, on a side of the media presentation device 110, on the bottom of the media presentation device 110, and/or may not be affixed to the media presentation device 110. For example, the meter 114 may be placed in a location near the media presentation device 110.

Figure 2:
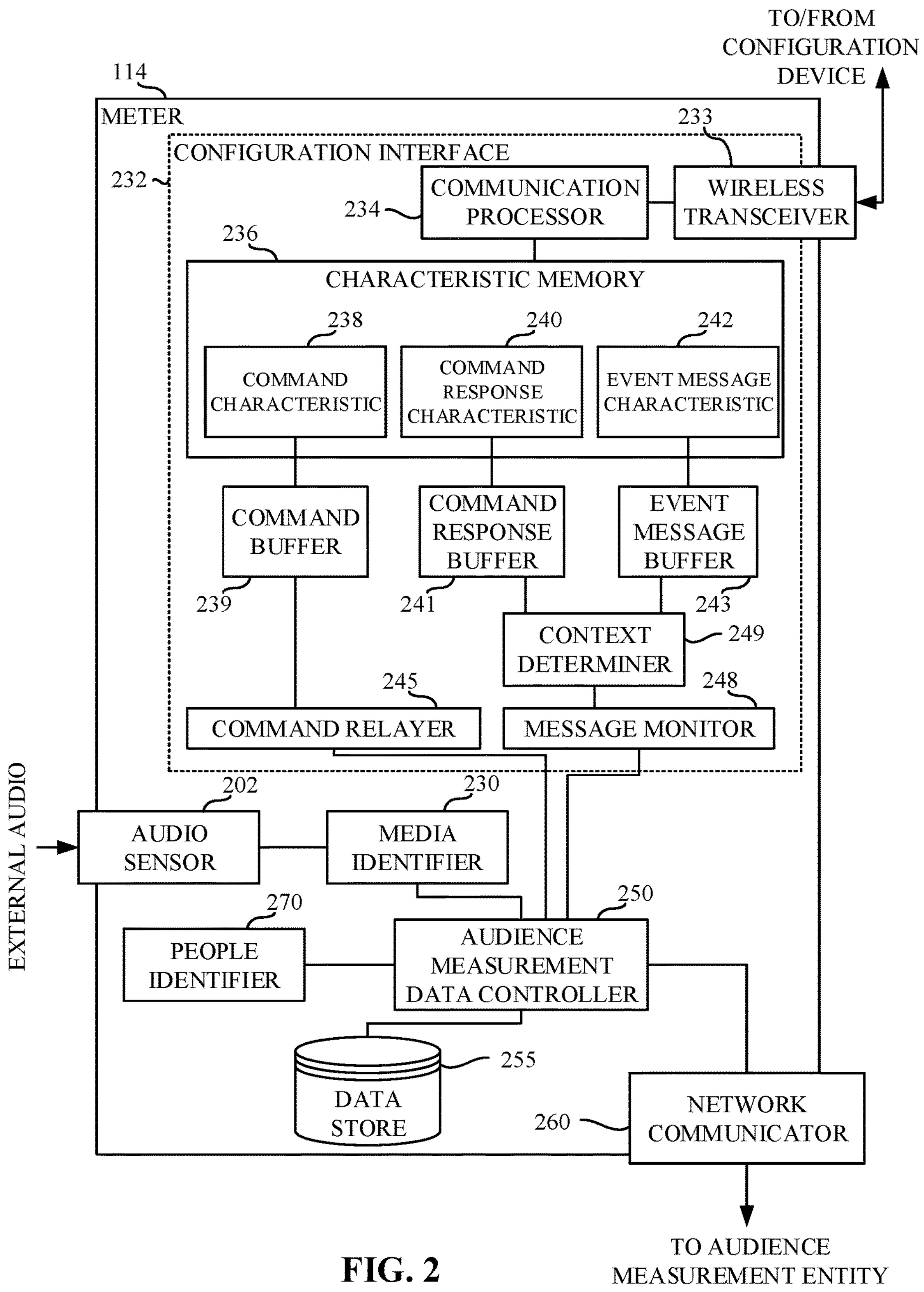
FIG. 2 is a block diagram of the example meter of FIG. 1.

FIG. 2 is a block diagram illustrating an example implementation of the example meter 114 of FIG. 1. The example meter 114 of FIG. 2 includes an example audio sensor 202, an example media identifier 230, an example configuration interface 232, an example audience measurement data controller 250, an example data store 255, an example network communicator 260, and an example people identifier 270. The example configuration interface 232 includes an example wireless transceiver 233, an example communication processor 234, and an example characteristic memory 236. The example characteristic memory 236 includes an example command characteristic 238, an example command response characteristic 240, and an example event message characteristic 242. The example configuration interface 232 additionally includes an example command buffer 239, an example command response buffer 241, an example event message buffer 243, an example command relayer 245, an example message monitor 248, and an example context determiner 249.

The example audio sensor 202 of the illustrated example of FIG. 2 is a microphone. The example audio sensor 202 receives ambient sound (e.g., free field audio) including audible media presented in the vicinity of the meter 114. Additionally or alternatively, the example audio sensor 202 may be implemented by a line input connection. The line input connection may allow an external microphone to be used with the meter 114 and/or, in some examples, may enable the audio sensor 202 to be directly connected to an output of a media presentation device (e.g., an auxiliary output of a television, an auxiliary output of an audio/video receiver of a home entertainment system, etc.) Advantageously, the meter 114 is positioned in a location such that the audio sensor 202 receives ambient audio produced by the television and/or other devices of the home entertainment system with sufficient quality to identify media presented by the media presentation device 110 and/or other devices of the media presentation environment 102 (e.g., a surround sound speaker system). For example, in examples disclosed herein, the meter 114 may be placed on top of the television, secured to the bottom of the television, etc.

In the illustrated example of FIG. 2, one audio sensor 202 is shown. However, any other number of audio sensor(s) may additionally or alternatively be used. For example, two audio sensors may be used, four audio sensors may be used, etc. Audio received by the example audio sensor 202 is passed to the media identifier 230 for identification.

The example media identifier 230 of the illustrated example of FIG. 2 analyzes audio received via the audio sensor 202 and identifies the media being presented. The example media identifier 230 of the illustrated example outputs an identifier of the media (e.g., media-identifying information) to the audience measurement data controller 250. In examples disclosed herein, the media identifier 230 utilizes audio watermarking techniques to identify the media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or one or more identifier(s) that may be mapped to media identifying information, into an audio and/or video component of the media. In some examples, the audio and/or video component of the media is selected to have a signal characteristic sufficient to hide the watermark. As used herein, the terms "code" and/or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. In some examples, to identify watermarked media, the watermark(s) are extracted and used to access a table of reference watermarks that are mapped to media identifying information.

In some examples, the media identifier 230 may utilize signature-based media identification techniques. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The example configuration interface 232 of the illustrated example of FIG. 2 receives configuration inputs from the configuration device 117, and provides outputs to the configuration device 117. As noted above, the example configuration interface 232 includes the example wireless transceiver 233, the example communication processor 234, and the example characteristic memory 236. The example characteristic memory 236 includes the example command characteristic 238, the example command response characteristic 240, and the example event message characteristic 242. The example configuration interface 232 additionally includes the example command buffer 239, the example command response buffer 241, the example event message buffer 243, the example command relayer 245, the example message monitor 248, and the example context determiner 249.

The example wireless transceiver 233 of the illustrated example of FIG. 2 is implemented by a Bluetooth Low Energy (BLE) radio. However, any other type of wireless transceiver may additionally or alternatively be used. In examples disclosed herein, the example wireless transceiver 233 communicates information to the communication processor 234 which performs actions based on the received information.

The example communication processor 234 of the illustrated example of FIG. 2 receives information from the wireless transceiver 233 and performs actions based on that received information. For example, a message received at the wireless transceiver from the configuration device 117 may request information stored in the characteristic memory 236. The example communication processor 234, upon receiving such information, may read the characteristic memory 236 and report the requested value to the configuration device 117 via the wireless transceiver 233. In some examples, the message received at the wireless transceiver 233 may request that data be written to the characteristic memory 236. In such an example, the example communication processor 234 writes the received information to the characteristic memory 236 (e.g., to the command characteristic 238).

In some other examples, the example communication processor 234 stores information available in a transmission buffer (e.g., the command response buffer 241 and/or the event message buffer 243) into the characteristic memory 236. In some examples, the communication processor 234 may then transmit, via the wireless transceiver 233, an advertisement that the data is available to be read from the characteristic memory 236 (e.g., such as data in the command response characteristic 240, in the event message characteristic 242, etc.) In examples disclosed herein, the advertisement is implemented as an indication using the BLE protocol. However, any other type(s) of advertisement and/or any other notification may additionally or alternatively be used.

The example characteristic memory 236 may be implemented by any device for storing data such as, for example, flash memory, magnetic media, optical media, etc. Furthermore, the data stored in the example characteristic memory 236 may be in any data format such as, for example, binary data, comma delimited data, tab delimited data, structured query language (SQL) structures, etc.

The example command characteristic 238 represents commands received from the configuration device to be executed by the audience measurement data controller 250. The example command response characteristic 240 represents information to be transmitted to the configuration device 117 for displaying in a command response window. The example event message characteristic 242 represents information to be transmitted to the configuration device 117 for displaying in an event message window. In illustrated example of FIG. 2, three characteristics are used in the characteristic memory 236. However, any other number of characteristics may additionally or alternatively be used. For example, the command characteristic 238 and the command response characteristic 240 may be implemented in a single characteristic (e.g., two total characteristics may be used).

In examples disclosed herein, each example characteristic 238, 240, 242 in the characteristic memory 236 has a maximum length of twenty bytes (e.g., as specified by the BLE protocol). However, any other maximum length may alternatively be used. In some examples, commands to be executed by the audience measurement data controller 250 and/or messages output by the audience measurement data controller 250 for transmission to the configuration device 117 may be longer than the twenty byte limit of the characteristic memory 236. To overcome this limitation, the example configuration interface 232 advantageously includes the example command buffer 239, the example command response buffer 241, and the example event message buffer 243.

The example command buffer 239 accumulates incoming data received via the command characteristic 238. In the illustrated example, the data received via the command characteristic 238 corresponds to a command or a portion of a command (e.g., if a command includes greater than twenty bytes of data, or the maximum size of the command characteristic 238). When the example communication processor 234 detects a termination sequence in the incoming data that would be stored to the command characteristic 238, the incoming data accumulated in the example command buffer 239 is identified as complete. The example command relayer 245 may transmit the resulting command stored in the command buffer 239 to the audience measurement data controller 250 for execution.

The example command response characteristic 240 and the example event message characteristic 242 store information that is to be transmitted to the configuration device 117. Because the BLE protocol used by the wireless transceiver 233 is limited in bandwidth and the amount of data that can be transmitted in a single message (e.g., the twenty byte limit for storing information in the characteristic memory), the example command response buffer 241 stores command response messages and/or portions thereof that have not yet been transmitted to the configuration device 117 via the command response characteristic 240. The example event message buffer 243 stores event messages and/or portions thereof that have not yet been transmitted to the configuration device via the event message characteristic 242.

In the illustrated example of FIG. 2, the example command buffer 239, the example command response buffer 241, and/or the event message buffer 243 may be implemented by any device for storing data such as, for example, flash memory, magnetic media, optical media, etc. Furthermore, the data stored in the example command buffer 239, the example command response buffer 241, and/or the example event message buffer 243 may be in any data format such as, for example, binary data, comma delimited data, tab delimited data, structured query language (SQL) structures, etc.

The example command relayer 245 of the illustrated example of FIG. 2 monitors the example command buffer 239 for complete commands to be executed at the audience measurement data controller 250. In some examples, the command relayer 245 works in tandem with the communication processor 234 to identify a termination sequence indicating the end of a command to be executed. When the complete command is identified, the example command relayer 245 transmits the command to the audience measurement data controller 250. The audience measurement data controller 250 may then execute the command and output any messages that may have resulted from the execution of the command.

The example message monitor 248 of the illustrated example of FIG. 2 monitors the audience measurement data controller 250 for messages to be transmitted to the configuration device 117. In examples disclosed herein, the example message monitor 248 monitors a message bus of the audience measurement data controller 250 to detect the message(s). However, any other approach to detect a message may additionally or alternatively be used. The example message monitor 248 passes the message(s) to the context determiner 249, which then determines whether the message is to be transmitted to the configuration device 117 using the command response characteristic 240 and/or the event message characteristic 242.

The example context determiner 249 of the illustrated example of FIG. 2 analyzes messages received via the example message monitor 248 to identify a context of the message. For example, the example context determiner 249 determines whether a given message was in response to a command received from the configuration device 117. Differentiating between message(s) that are in response to command(s) received from the configuration device 117 facilitates display of a message at the configuration device 117 in an appropriate output location corresponding to whether the message was in response to the command. If, for example, all messages were displayed in a single output window of the configuration device 117, event messages might overrun the message window and/or otherwise obscure and/or make it difficult for a user to verify that a command was executed successfully.

In examples disclosed herein, the example context determiner 249 utilizes a hierarchical state machine to identify the context of the message. Context information concerning messages that are generated by the audience measurement data controller 250 includes information such as, for example, the hierarchical structure of commands and/or instructions that caused the message to be generated. For example, a user may enter a first instruction for execution that may also trigger a second instruction to be executed. The second instruction, when executed, may cause an output that would be displayed to a user. However, if the second instruction were executed as a result of the first instruction (which was executed in response to user input), the second instruction is considered to have been executed within the context of the user input that cause the first instruction to be executed. The example context determiner 249 reviews the hierarchical structure to determine whether any inherited contexts identify that the message was in response to a command recently issued to the audience measurement data controller 250 by the command relayer 245. However, any other approach to determining a context of a message and/or, more generally, whether the message was in response to a command relayed to the audience measurement data controller 250 may additionally or alternatively be used.

The example audience measurement data controller 250 of the illustrated example of FIG. 2 receives media identifying information (e.g., a code, a signature, etc.) from the media identifier 230 and audience identification data from the people identifier 270, and stores the received information in the data store 255. In some examples, upon identification of media, in response to execution of a command (e.g., a command received via the command relayer 245), and/or other events within the audience measurement data controller 250, the audience measurement data controller may provide a message to the message monitor 248. The example audience measurement data controller 250 periodically and/or a-periodically transmits, via the network communicator 260, the audience measurement information stored in the data store 255 to the central facility 190 for aggregation and/or preparation of media monitoring reports.

The example data store 255 of the illustrated example of FIG. 2 may be implemented by any device for storing data such as, for example, flash memory, magnetic media, optical media, etc. Furthermore, the data stored in the example data store 255 may be in any data format such as, for example, binary data, comma delimited data, tab delimited data, structured query language (SQL) structures, etc. In the illustrated example, the example data store 255 stores media identifying information collected by the media identifier 230 and audience identification data collected by the people identifier 270. In some examples, the example data store 255 additionally stores panelist demographic information such that received user identifiers of the audience measurement data can be translated into demographic information prior to transmission to the central facility 190.

The example people identifier 270 of the illustrated example of FIG. 2 determines audience identification data representative of the identities of the audience member(s) (e.g., panelists) present in the media presentation environment 102. In some examples, the people identifier 270 collects audience identification data by periodically or a-periodically prompting audience members in the media presentation environment 102 to identify themselves as present in the audience. Panelists may identify themselves by, for example, pressing a button on a remote, speaking their name, etc. In some examples, the people identifier 270 prompts the audience member(s) to self-identify in response to one or more predetermined events (e.g., when the media presentation device 110 is turned on, a channel is changed, an infrared control signal is detected, etc.). The people identifier 270 provides the audience identification data to the audience measurement data controller such that the audience measurement data can be correlated with the media identification data to facilitate an identification of which media was presented to which audience member.

The example network communicator 260 of the illustrated example of FIG. 2 transmits audience measurement information provided by the audience measurement data controller 250 (e.g., data stored in the data store 255) to the central facility 190 of the audience measurement entity. In the illustrated example, the network communicator 260 is implemented by a WiFi radio that communicates via the LAN hosted by the example gateway 140. In some examples, the network communicator 260 facilitates wired communication via an Ethernet network hosted by the example gateway 140 of FIG. 1.

Figure 3:
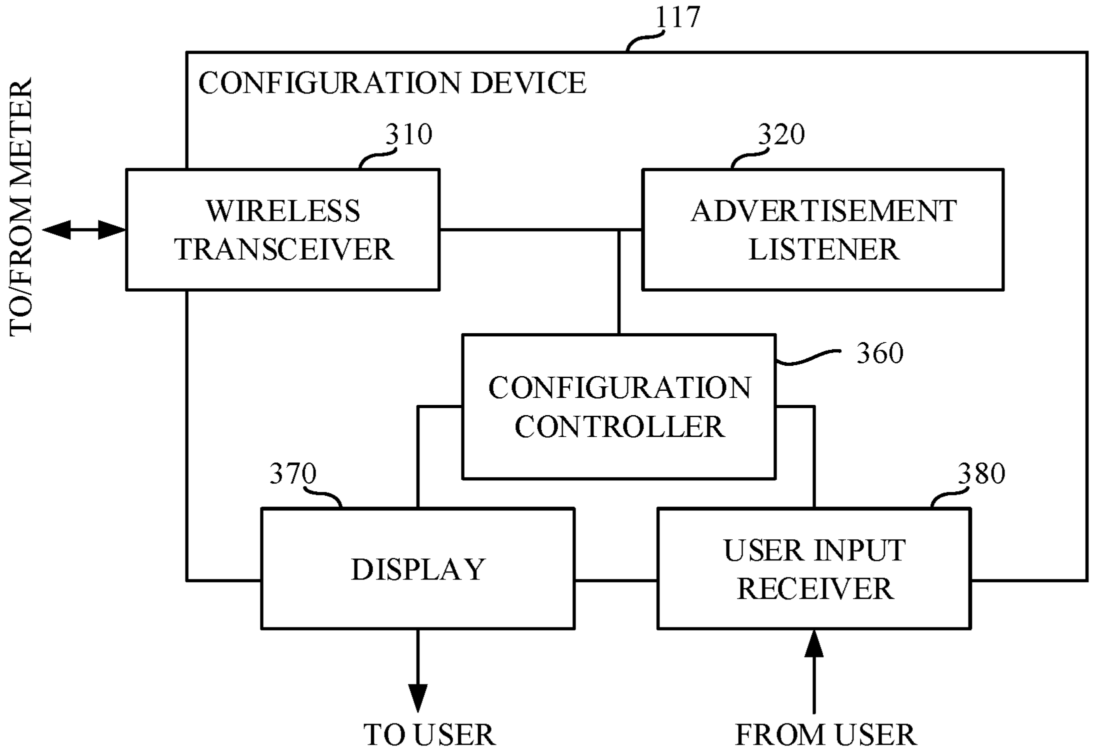
FIG. 3 is a block diagram of the example configuration device of FIG. 1.

FIG. 3 is a block diagram of the example configuration device 117 of FIG. 1. In the illustrated example of FIG. 3, the example configuration device 117 includes an example wireless transceiver 310, an example advertisement listener 320, an example configuration controller 360, an example display 370, and an example user input receiver 380.

The example wireless transceiver 310 of the illustrated example of FIG. 3 is implemented by a Bluetooth Low Energy (BLE) radio. However, any other type of wireless transceiver may additionally or alternatively be used. In examples disclosed herein, the example wireless transceiver 310 enables communication to and/or from the meter 114. Communications from the meter 114 are passed to the advertisement listener 320 and/or the configuration controller 360, which can then perform operations based on the received information.

The example advertisement listener 320 of the illustrated example of FIG. 3 listens for advertisements received from the meter 114. In examples disclosed herein, the advertisements may be, for example, an advertisement to establish a connection with the meter 114, a notification and/or an indication (e.g., an indication using the BLE protocol) that information stored in the characteristic memory 236 has been updated, etc. In some examples, the advertisement listener 320 determines whether any action should be performed in response to the characteristic memory 236 being updated. In some examples, the advertisement listener 320 requests (e.g., via command(s) sent via the wireless transceiver 310) that the meter 114 transmit advertisements for specific characteristics (e.g., the command response characteristic 240, the event message characteristic 242) within the characteristic memory 236.

The example configuration controller 360 of the illustrated example of FIG. 3 controls transmission of commands to the meter 114 via the wireless transceiver 310 based on input received from the user input receiver 380. The example configuration controller 360 requests (e.g., via command(s) sent via the wireless transceiver 310) information from the meter 114 upon detection of an advertisement at the advertisement listener 320. In examples disclosed herein, the configuration controller 360 transmits information received from the meter 114 to the display 370 for display to a user of the configuration device 117.

The example display 370 of the illustrated example of FIG. 3 displays information provided to and/or from the meter 114 to a user of the configuration device 117. The example user input receiver 380 of the illustrated example of FIG. 3 receives input from the user such as, for example, commands to be transmitted to the meter 114. In examples disclosed herein, the example display 370 and the example user input receiver 380 are implemented by a touchscreen. However, any other sort of user interface device(s) may additionally or alternatively be used. For example, the example display 370 may be implemented by speakers, light emitting diodes, etc. In some examples, the example user input receiver 380 may be implemented by a keyboard, a button, etc.

Figure 4:
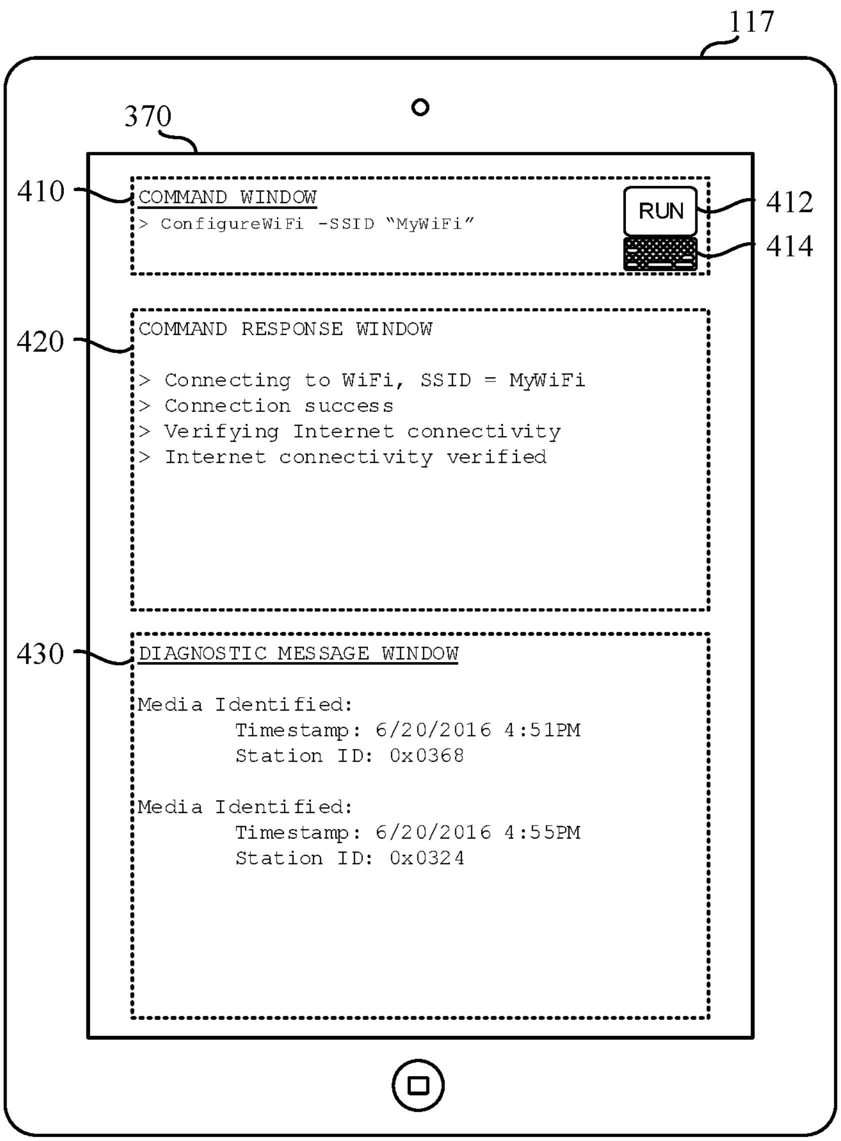
FIG. 4 is an example output of the example display of the example configuration device of FIGS. 1 and/or 3.

FIG. 4 is an example output of the example display 370 of the example configuration device 117 of FIGS. 1 and/or 3. In the illustrated example of FIG. 4, the example display 370 outputs an example command window 410, an example command response window 420, and an example event message window 430.

The example command window 410 enables a user (e.g., an installer) of the meter 114 to enter a command into the configuration device 117 for transmission to and subsequent execution by the meter 114. In the illustrated example of FIG. 4, the command window 410 enables the user to enter a text command. The example command window 410 provides a "run" button 412 to enable the user to indicate that the entered command is ready to be transmitted for execution. The example command window 410 also provides a keyboard input 414 to cause the configuration device 117 to display a keyboard (e.g., a soft keyboard) to the user to facilitate entry of the command. However, user input may be received in any other fashion such as, for example, a physical keyboard, voice recognition, etc. While a user is to enter text representing a command to be executed in the illustrated example of FIG. 4, in some examples, a user interface to allow the user to select the command (e.g., from a list of commands) and to enter parameters for the command may be provided. In the illustrated example, the user has entered a "ConfigureWiFi" command which, when executed by the meter 114, configures the meter 114 to communicate with a WiFi network identified by a Service Set Identifier (SSID) that is proved as a parameter to the command (e.g., "MyWiFi"). Of course, any other command to, for example, configure any other parameter of the meter 114 may additionally or alternatively be used.

The example command response window 420 displays messages that are a result of a command that was transmitted to the meter 114 by the configuration device 117. In examples disclosed herein, the meter 114 identifies whether a received message is in response to an executed command and, if so, places the message into the command response buffer 340 of FIG. 3. Based on the presence of the message in the command response buffer 340, the example configuration controller 360 causes the message to be displayed via the command response window 420. In the illustrated example of FIG. 4, the messages are displayed in chronological order, with the most recent messages appearing towards the bottom of the example command response window 420. However, any other approach for displaying messages may additionally or alternatively be used. In the illustrated example of FIG. 4, the example command response window 420 indicates that, in response to the "ConfigureWiFi" command, the meter 114 provided an output indicating that the meter 114 connected to the WiFi network with an SSID of "MyWiFi," and verified Internet connectivity.

The example event message window 430 displays messages that are not a result of a command that was transmitted to the meter 114 by the configuration device 117. In examples disclosed herein, if the meter 114 identifies that a received message is not in response to an executed command, the meter 114 places the message into the event message buffer 350 of FIG. 3. Based on the presence of the message in the event message buffer 350, the example configuration controller 360 causes the message to be displayed via the event message window 430. In the illustrated example of FIG. 4, the messages are displayed in chronological order, with the most recent messages appearing towards the bottom of the example event message window 430. However, any other approach for displaying messages may additionally or alternatively be used. In the illustrated example of FIG. 4, the example event message window 430 presents information concerning media identifications made by the media identifier 230 of the meter 114.

While an example manner of implementing the example meter 114 of FIG. 1 is illustrated in FIG. 2, one or more of the elements, processes and/or devices illustrated in FIG. 2 may be combined, divided, re-arranged, omitted, eliminated and/or implemented in any other way. Further, the example audio sensor 202, the example media identifier 230, the example configuration interface, the example wireless transceiver 233, the example communication processor 234, the example characteristic memory 236, the example command buffer 239, the example command response buffer 241, the example event message buffer 243, the example command relayer 245, the example message monitor 248, the example context determiner 249, the example audience measurement data controller 250, the example data store 255, the example network communicator 260, the example people identifier 270, and/or, more generally, the example meter 114 of FIGS. 1 and/or 2 may be implemented by hardware, software, firmware and/or any combination of hardware, software and/or firmware. Thus, for example, any of the example audio sensor 202, the example media identifier 230, the example configuration interface, the example wireless transceiver 233, the example communication processor 234, the example characteristic memory 236, the example command buffer 239, the example command response buffer 241, the example event message buffer 243, the example command relayer 245, the example message monitor 248, the example context determiner 249, the example audience measurement data controller 250, the example data store 255, the example network communicator 260, the example people identifier 270, and/or, more generally, the example meter 114 of FIGS. 1 and/or 2 could be implemented by one or more analog or digital circuit(s), logic circuits, programmable processor(s), application specific integrated circuit(s) (ASIC(s), programmable logic device(s) (PLD(s) and/or field programmable logic device(s) (FPLD(s). When reading any of the apparatus or system claims of this patent to cover a purely software and/or firmware implementation, at least one of the example audio sensor 202, the example media identifier 230, the example configuration interface, the example wireless transceiver 233, the example communication processor 234, the example characteristic memory 236, the example command buffer 239, the example command response buffer 241, the example event message buffer 243, the example command relayer 245, the example message monitor 248, the example context determiner 249, the example audience measurement data controller 250, the example data store 255, the example network communicator 260, the example people identifier 270, and/or, more generally, the example meter 114 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 114 of FIGS. 1 and/or 2 may include one or more elements, processes and/or devices in addition to, or instead of, those illustrated in FIG. 2, and/or may include more than one of any or all of the illustrated elements, processes and devices.

Likewise, while an example manner of implementing the example configuration device 117 of FIG. 1 is illustrated in FIG. 3, one or more of the elements, processes and/or devices illustrated in FIG. 3 may be combined, divided, re-arranged, omitted, eliminated and/or implemented in any other way. Further, the example wireless transceiver 310, the example advertisement listener 320, the example configuration controller 360, the example display 370, the example user input receiver 380, and/or, more generally, the example configuration device 117 of FIGS. 1 and/or 3 may be implemented by hardware, software, firmware and/or any combination of hardware, software and/or firmware. Thus, for example, any of the example wireless transceiver 310, the example advertisement listener 320, the example configuration controller 360, the example display 370, the example user input receiver 380, and/or, more generally, the example configuration device 117 of FIGS. 1 and/or 3 could be implemented by one or more analog or digital circuit(s), logic circuits, programmable processor(s), application specific integrated circuit(s) (ASIC(s), programmable logic device(s) (PLD(s) and/or field programmable logic device(s) (FPLD(s). When reading any of the apparatus or system claims of this patent to cover a purely software and/or firmware implementation, at least one of the example wireless transceiver 310, the example advertisement listener 320, the example configuration controller 360, the example display 370, the example user input receiver 380, and/or, more generally, the example configuration device 117 of FIGS. 1 and/or 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example configuration device 117 of FIGS. 1 and/or 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example meter 114 of FIGS. 1 and/or 2 are shown in FIGS. 5, 8, 9, 10, and/or 11. In these examples, the machine readable instructions comprise a program(s) for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program(s) is/are described with reference to the flowchart(s) illustrated in FIGS. 5, 8, 9, 10, and/or 11, many other methods of implementing the example meter 114 may alternatively be used. For example, the order of execution of the blocks may be changed, and/or some of the blocks described may be changed, eliminated, or combined.

Figure 6:
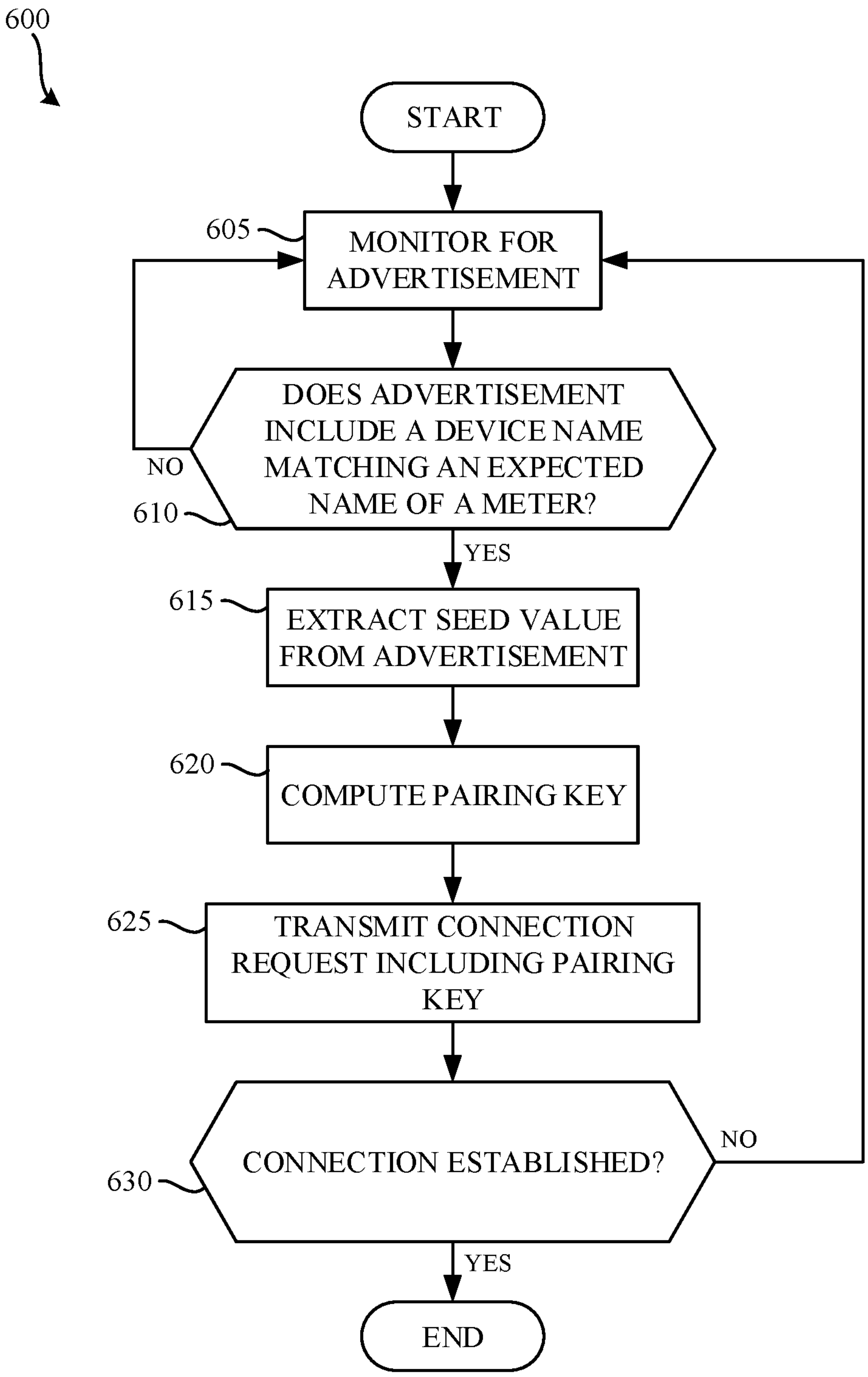
FIG. 6 is a flowchart representative of example machine-readable instructions that may be executed to implement the example configuration device of FIGS. 1 and/or 3 to establish a connection with the meter of FIGS. 1 and/or 2.
Figure 7:
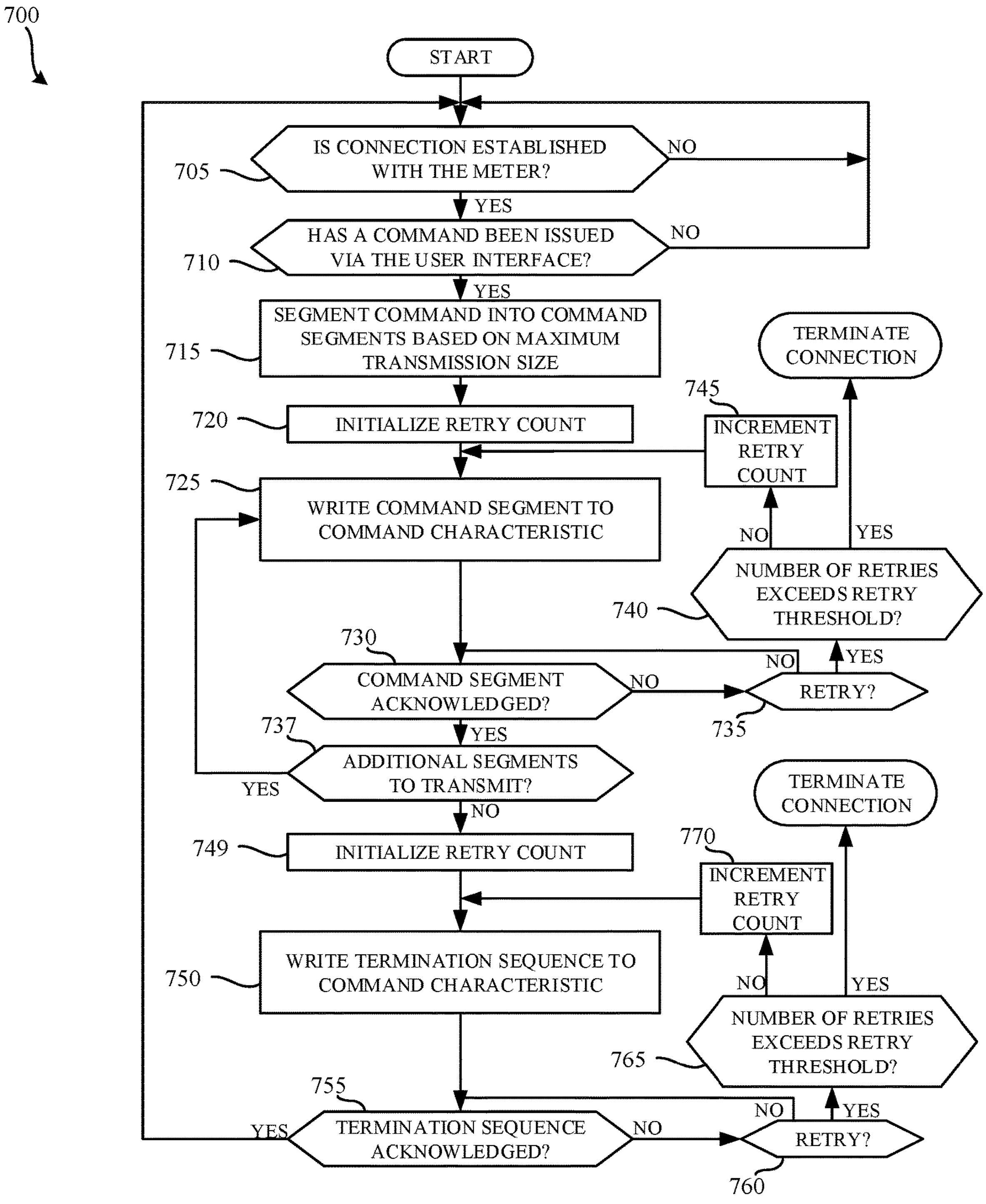
FIG. 7 is a flowchart representative of example machine-readable instructions that may be executed to implement the configuration device of FIGS. 1 and/or 3 to transmit a command to the meter of FIGS. 1 and/or 2.
Figure 12:
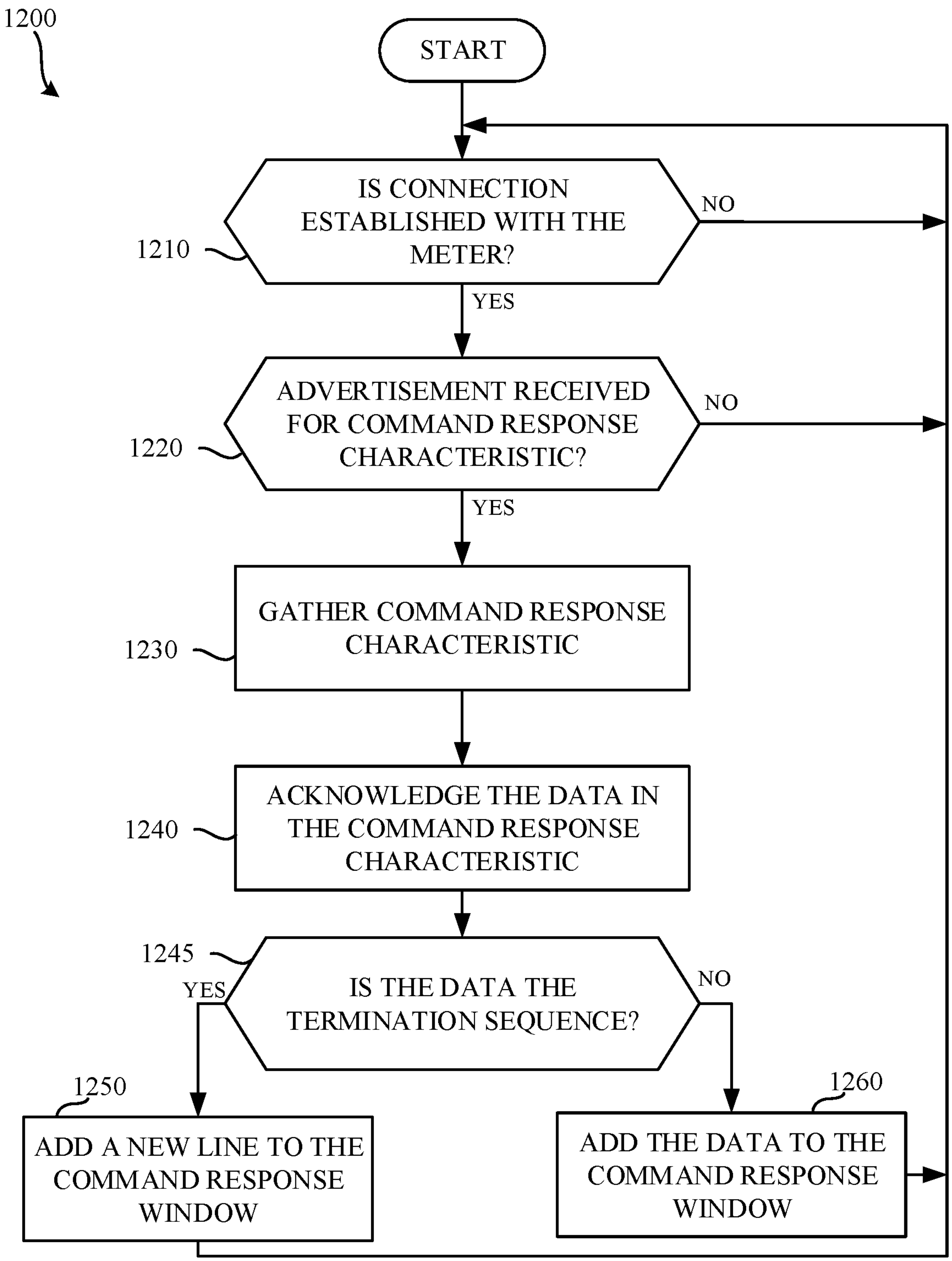
FIG. 12 is a flowchart representative of example machine readable instructions that may be executed to implement the configuration device of FIGS. 1 and/or 3 to receive and display a response to a command.

Likewise, flowcharts representative of example machine readable instructions for implementing the example configuration device 117 of FIGS. 1 and/or 3 are shown in FIGS. 6, 7, 12, and/or 13. In these examples, the machine readable instructions comprise a program(s) for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program(s) is/are described with reference to the flowchart(s) illustrated in FIGS. 6, 7, 12, and/or 13, many other methods of implementing the example configuration device 117 may alternatively be used. For example, the order of execution of the blocks may be changed, and/or some of the blocks described may be changed, eliminated, or combined.

As mentioned above, the example processes of FIGS. 5, 6, 7, 8, 9, 10, 11, 12, and/or 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, 7, 8, 9, 10, 11, 12, and/or 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
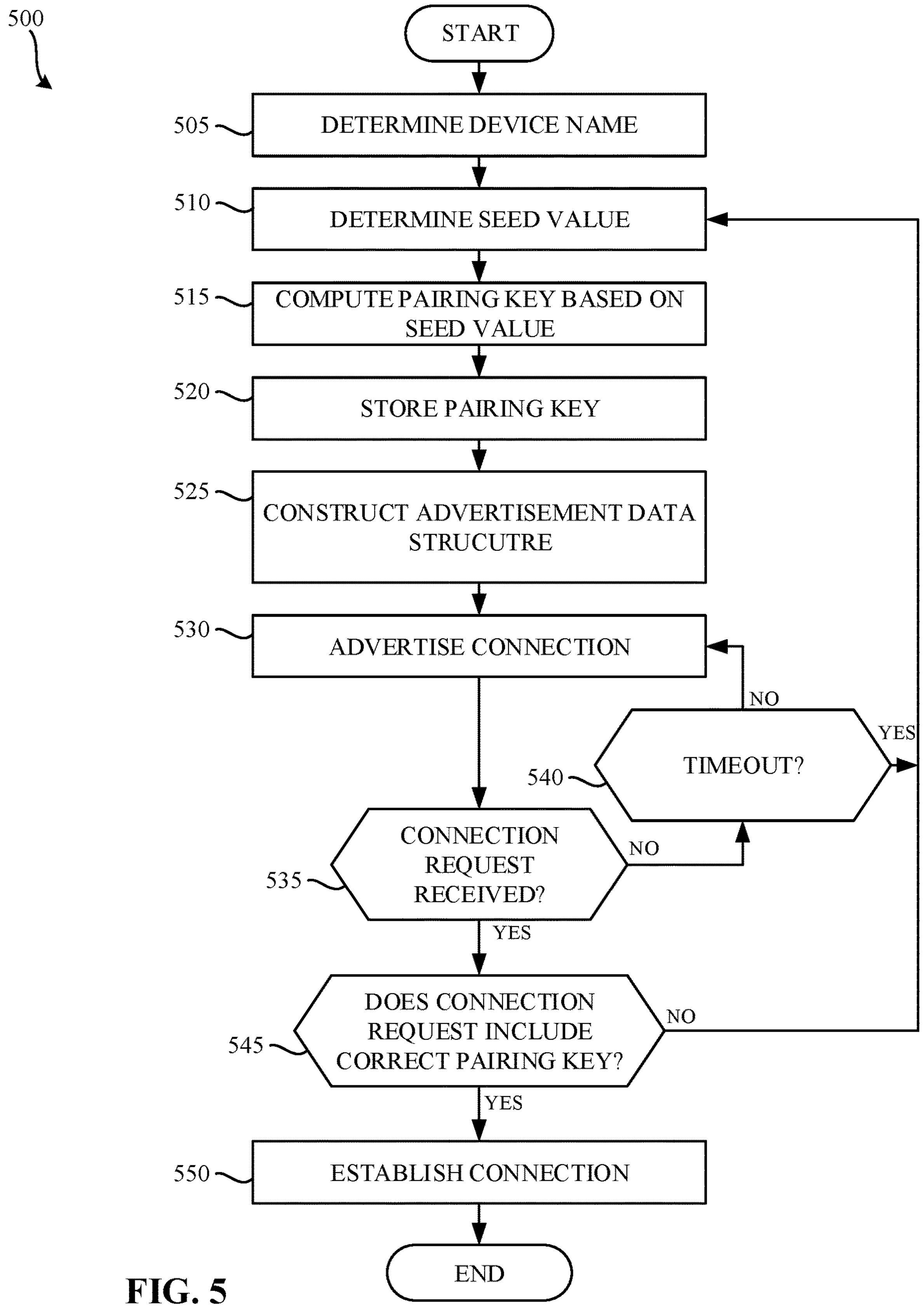
FIG. 5 is a flowchart representative of example machine-readable instructions that may be executed to implement the example meter of FIGS. 1 and/or 2 to establish a connection with the configuration device of FIGS. 1 and/or 3.

FIG. 5 is a flowchart representative of example machine-readable instructions that may be executed to implement the example meter 114 of FIGS. 1 and/or 2 to establish a connection with the configuration device 117 of FIGS. 1 and/or 3. The example process 500 of the illustrated example of FIG. 5 begins when the example communication processor 234 determines a device name of the meter 114 (block 505). In the illustrated example of FIG. 5, the device name is identified by querying a memory location in the data store 255. However, the device name may be identified in any other fashion. In examples disclosed herein, the device name is a human readable name that can be used to identify the meter 114. However, any other type of device name may additionally or alternatively be used.

The example communication processor 234 determines a seed value (block 510). In examples disclosed herein the seed value is determined by generating a random number. However, any other approach to determining a seed value may additionally or alternatively be used. In some examples, the seed value may be used to determine the device name and/or a portion of the device name. Using a seed value to determine the device name enables the configuration device 117 to affirmatively determine of the device transmitting the advertisement is actually the meter 114.

The example communication processor 234 computes a pairing key based on the seed value (block 515). In examples disclosed herein, the example communication processor 234 computes the pairing key by generating a hash of the seed value. However, any other approach to determining a pairing key may additionally or alternatively be used. The example communication processor 234 stores the pairing key in the data store 255 (block 520). The example communication processor 234 then constructs an advertisement data structure that includes the device name and the seed value (block 525). In examples disclosed herein, the device name and the seed value are stored in separate portions of the advertisement data structure. However, in some other examples, the seed value is appended to the device name. The example communication processor 234 then advertises a connection to the meter 114 via the wireless transceiver 233 using the advertisement data structure (block 530).

The advertisement data structure may then be received by other devices (e.g., the configuration device 117) and may be used to facilitate connectivity with the meter 114. As discussed below in connection with FIG. 6, the configuration device 117 receives the advertised connection, and determines a pairing key based off of the seed value. The configuration device 117 then transmits a connection request to the meter 114 to initialize and/or establish a connection between the meter 114 and the configuration device 117.

Returning to FIG. 5, the example communication processor 234 determines whether a connection request has been received (block 535). If no connection request has been received, (e.g., block 535 returns a result of NO), the example communication processor 234 determines whether a timeout has occurred (block 540). In the illustrated example of FIG. 5, the timeout is one minute. However, any other time of value may additionally or alternatively be used. If no timeout has occurred (e.g., block 540 returns a result of NO), control proceeds to blocks 530 and 535 where the example communication processor 234 continues to advertise the connection and determine whether a connection request has been received. If the example communication processor determines that the timeout has occurred (e.g., block 540 returns a result of YES), control proceeds to block 510 where the example communication processor 234 determines a new seed value. By determining a new seed value, the advertisement data structure determined in connection with block 525 will be changed, as well as the expected pairing key determined in connection with block 515. Determining a new seed value also reduces the likelihood that a rogue device may perform a brute force attack to attempt to connect to the meter 114 by, for example, continually guessing pairing keys.

Returning to block 535, if the example communication processor 234 determines that a connection request has been received (e.g., block 535 returns a result of YES), the example communication processor 234 determines whether the connection request includes a correct pairing key (e.g., a pairing key that matches the pairing key stored in the data store 255 in connection with block 520) (block 545). If the communication processor 234 determines that the connection request does not include a correct pairing key (e.g., block 545 returns a result of NO), control returns to block 510 where a new seed value is determined and the process of blocks 510 through 535 is repeated until a connection request is received.

If the example communication processor 234 determines that the connection request includes a correct pairing key (e.g., block 545 returns a result of YES), the example communication processor 234 establishes the connection with the configuration device 117 (block 550). The example meter 114 may then communicate with the configuration device 117 via the wireless transceiver 233.

FIG. 6 is a flowchart representative of example machine-readable instructions that may be executed to implement the example configuration device 117 of FIGS. 1 and/or 3 to establish a connection with the meter 114 of FIGS. 1 and/or 2. The example process 600 the illustrated example of FIG. 6 begins when the example advertisement listener 320 monitors for an advertisement (block 605). In examples disclosed herein, upon receipt of the advertisement, the example advertisement listener 320 informs the configuration controller 360 that an advertisement has been received. The example configuration controller 360 inspects the advertisement data structure to determine whether the advertisement includes a device name matching an expected name of the meter (block 610). In some examples, many different devices within the media presentation environment 102 may transmit advertisements. Determining whether the advertisement includes a device name that matches and expected name of the meter 114 reduces the likelihood that the configuration device 117 would attempt to connect to a device other than the meter 114. In some examples, the example configuration controller 360 determines the expected device name and/or a portion of the expected device name based on the seed value (and/or a portion of the seed value) transmitted in the advertisement data structure. If the advertisement does not include a device name that matches an expected name of the meter 114 (e.g., block 610 returns a result of NO), the example advertisement listener 320 continues to monitor for an advertisement (block 605).

If the example configuration controller 360 determines that the advertisement includes a device name that matches an expected name of the meter (e.g., block 610 returns a result of YES), the example configuration controller 360 extracts the seed value from the advertisement data structure (block 615). The example configuration controller 360 then computes a pairing key based on the seed value (block 620). In examples disclosed herein, the procedure for computing the pairing key at block 620 is the same as the computation of the pairing key at block 515 of FIG. 5. As such, both the configuration device 117 and the meter 114 are expected to compute the same pairing key based on the seed value. The example configuration controller 360 then transmits, via the wireless transceiver 310, a connection request that includes the computed pairing key (block 625). The example configuration controller 360 then waits to determine whether the meter 114 has accepted the computed pairing key and established the connection (block 630). If no connection has been established, (e.g., block 630 returns a result of NO), the example advertisement listener 320 continues to monitor for an advertisement (block 605). If the example configuration controller 360 determines that the connection has been established (e.g., block 630 returns result of YES), the process 600 illustrated in the example of FIG. 6 ends.

However, in some examples the process 600 of FIG. 6 may be repeated to attempt to re-establish a connection with the meter 114.

FIG. 7 is a flowchart representative of example machine-readable instructions that may be executed to implement the configuration device 117 of FIGS. 1 and/or 3 to transmit a command to the meter 114 of FIGS. 1 and/or 2. The example process 700 of FIG. 7 begins when the example configuration controller 360 determines whether a connection is established with the meter 114 (block 705). If no connection is established (e.g., block 705 returns a result of NO), the example configuration controller 360 waits until connection is established. If the connection is established (e.g., block 705 returns a result of YES), the example configuration controller 360 determines whether a command has been issued via the user interface (e.g., the display 370 and/or the user input receiver 380) of the configuration device 117 (block 710). If the example configuration controller 360 determines that no command has been issued (e.g., block 710 returns a result of NO), control returns to block 705 where the example configuration controller 360 continues to confirm that the connection is established (block 705) and await a command (block 710).

If the example configuration controller 360 determines that a command has been issued via the user interface (e.g., block 710 returns a result of YES), the example configuration controller 360 segments the command into command segments based on a maximum transmission size of data to be transmitted via the wireless transceiver (block 715). In examples disclosed herein, the maximum transmission size is 20 bytes. Thus, for example, if a command to be transmitted were 52 bytes long, the example command would be segmented into three segments (two segments of 20 bytes followed by a segment of 12 bytes). However, any other transmission size may additionally or alternatively be used. The example configuration controller 360 initializes a retry count. (block 720). In the illustrated example, the retry count is initialized to zero. However, any other value may additionally or alternatively be used. The example configuration controller 360, via the wireless transceiver 310, transmits an instruction to write the command segment to the command characteristic 238 of the example characteristic memory 236 (block 725).

Upon writing information to the characteristic memory 236, the example meter 114 will respond with an acknowledgment. The example configuration controller 360 determines whether the acknowledgment has been received (block 730). If no acknowledgment has been received (e.g., block 730 returns result of NO), the example configuration controller 360 determines whether a retry is necessary (block 735). A retry may be necessary when, for example, more than five seconds have elapsed since transmission of the instruction to write the command segment to the command characteristic. However, any other time may additionally or alternatively be used. If the example configuration controller 360 determines that no retry should be attempted, (e.g., block 735 returns result of NO), the example configuration controller 360 continues to wait for the acknowledgment of the command sequence.

If the example configuration controller 360 determines that a retry should be attempted (e.g., block 735 returns a result of YES), the example configuration controller 360 determines whether the number of retries exceeds a retry threshold (block 740). In the illustrated example of FIG. 7, the retry threshold is three attempts. However, any other retry threshold may additionally alternatively be used. If the number of retries does not exceed the retry threshold (e.g., block 740 returns result of NO), the example configuration controller 360 increments the retry count (block 745), and retransmits the instruction to write the command segment to the command characteristic 238 of the example characteristic memory 236 (block 725). If the example configuration controller 360 determines that the number of retries exceeds the retry threshold (e.g., block 740 returns a result of YES), the example configuration controller 360 terminates the connection with the meter 114. A connection may then be re-established via, for example, the procedures described in the illustrated examples of FIGS. 5 and/or 6.

Returning to block 730, if the example configuration controller 360 determines that the command sequence has been acknowledged, the example configuration controller 360 determines whether any additional command segments exist to be transmitted (block 737). If additional command segments exist to be transmitted (e.g., block 737 returns a result of YES), the example configuration controller 360 transmits, via the wireless transceiver 310, an instruction to write the next command segment to the command characteristic 238 of the example characteristic memory 236 (block 725). The example process of blocks 725 through 737 is repeated until there are no additional command segments to be transmitted. In some examples, upon determining that there is an additional segment to transmit, the example configuration controller 360 may additionally re-initialize the retry count (block 720). Reinitializing the retry count ensures that failures that might occur when attempting to transmit a first segment do not affect transmission of subsequent segments. When receiving subsequent segments, the example meter aggregates the command segments to form a complete command.

If the example configuration controller 360 determines that there are no additional command segments to transmit (e.g., block 737 returns a result of NO), the example configuration controller 360 re-initializes the retry count (block 749). The example configuration controller then transmits an instruction to write a termination sequence to the command characteristic 238 of the example characteristic memory 236 (block 750). In examples disclosed herein, the termination sequence is a sequence of characters and/or data (e.g., "END_MSG") that is not otherwise expected to be a message generated for transmission. Transmitting the termination sequence informs the meter 114 that transmission of the command segments is complete, and that the segments that have been transmitted form a complete command. In response to the termination sequence, the example meter 114 may then execute the complete command and acknowledge the termination sequence. The example configuration controller 360 waits for an acknowledgment of the termination sequence. (block 755). In examples disclosed herein, the termination sequence is transmitted in a single message separated from the message segments. However, the termination sequence may be transmitted as part of the message segments (e.g., may be included at the end of the last message segment). Moreover, in some examples, the termination sequence may be transmitted using multiple messages.

If the termination sequence has not been acknowledged (e.g., block 755 returns result of NO), the example configuration controller 360 determines whether a retry is necessary (block 760). A retry may be necessary when, for example, more than five seconds have elapsed since transmission of the instruction to write the termination sequence to the command characteristic 238. However, any other time may additionally or alternatively be used. If the example configuration controller 360 determines that no retry should be attempted (e.g., block 760 returns result of NO), the example configuration controller 360 continues to wait for the acknowledgment of the termination sequence. If the example configuration controller 360 determines that a retry should be attempted (e.g., block 760 returns a result of YES), the example configuration controller 360 determines whether the number of retries exceeds the retry threshold (block 765). As noted above, the retry threshold of the illustrated example of FIG. 7 is three attempts. However, any other retry threshold may additionally alternatively be used. Moreover, a different retry threshold may be used when attempting to transmit a termination sequence as compared to transmitting a command segment. For example, a larger retry threshold may be used to ensure that more attempts are made to communicate the termination sequence.

If the number of retries does not exceed the retry threshold (e.g., block 765 returns result of NO), the example configuration controller 360 increments the retry count (block 770), and retransmits the instruction to write the termination sequence to the command characteristic 238 of the example characteristic memory 236 (block 750). If the example configuration controller 360 determines that the number of retries exceeds the retry threshold (e.g., block 765 returns a result of YES), the example configuration controller 360 terminates the connection with the meter 114. A connection may then be reestablished via, for example, the procedures described in the illustrated examples of FIGS. 5 and/or 6.

If the example configuration controller 360 determines that the termination sequence has been acknowledged (e.g., block 755 returns result of YES), control proceeds to block 705, where the example process 700 of the illustrated example of FIG. 7 is repeated to continually monitor for and/or transmit commands to the meter 114.

Figure 8:
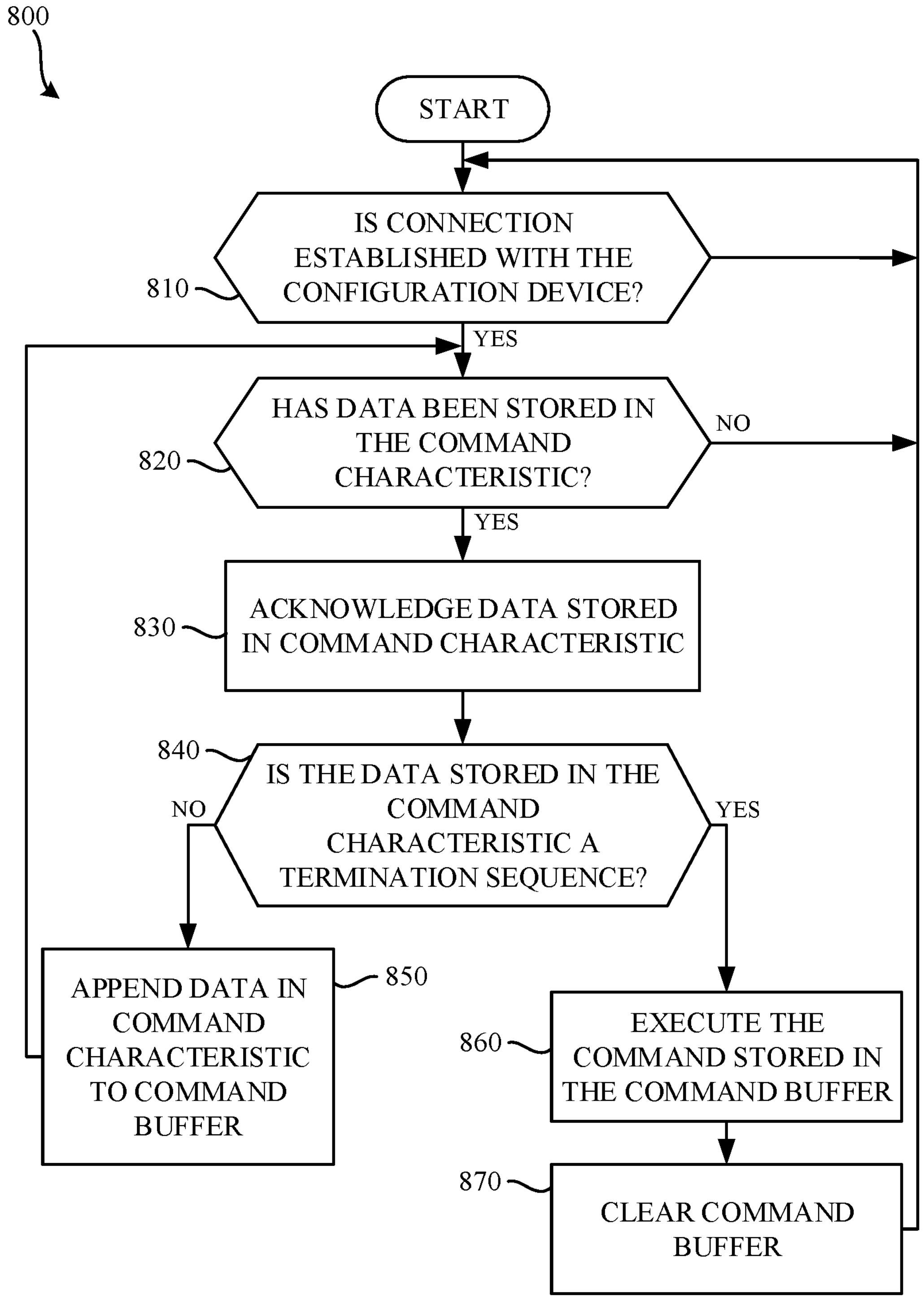
FIG. 8 is a flowchart representative of example machine readable instructions that may be executed to implement the meter of FIGS. 1 and/or 2 to receive a command from the configuration device of FIGS. 1 and/or 3.

FIG. 8 is a flowchart representative of example machine readable instructions that may be executed to implement the meter 114 of FIGS. 1 and/or 2 to receive a command from the configuration device 117 of FIGS. 1 and/or 3. The example process 800 of the illustrated example of FIG. 8 begins when the example communication processor 234 of the example communication interface 232 determines whether a connection is established with configuration device (block 810). If no connection is established with the configuration device 117, (e.g., block 810 returns a result of NO), the example communication processor 234 continues to wait for the connection to be established. If the example communication processor 234 determines that a connection has been established with the example configuration device 117 (e.g., block 810 returns result of YES), the example command relayer 245 determines whether data has been stored in the command characteristic 238 (block 820). In examples disclosed herein, the example configuration device 117 transmits a write instruction (e.g., a write instruction using the BLE protocol) to write data to the command characteristic 238 of the characteristic memory 236.

The command relayer 245 monitors the command characteristic 238 to determine whether data has been stored therein (e.g., data that has not been acknowledged). If the example command relayer 245 determines that no new data (e.g., data that has not yet been acknowledged) has been stored in the command characteristic 238 (e.g., block 820 returns a result of NO), control proceeds to block 810 where the example communication processor 234 continues to monitor for the establishment of a connection with the configuration device 117. If the example command relayer 245 identifies that data has been stored in the command characteristic (e.g., block 820 returns a result of YES), the example command relayer 245, via the example communication processor 234, acknowledges the data stored in the command characteristic to the configuration device 117 (block 830). Acknowledging the data stored in the command characteristic informs the configuration device 117 that subsequent portions of a command to be executed by the meter 114 may be transmitted.

The example command relayer 245 determines whether the data stored in the command characteristic 238 is a termination sequence (block 840). As noted above, in examples disclosed herein, the termination sequence may be any character in a set of characters that, when stored in the command characteristic 238 indicates to the command relayer 245 that all portions of command have been transmitted. If the example command relayer 245 identifies that the data stored in the command characteristic is not a termination sequence (e.g., block 840 returns result of NO), the example command relayer 245 appends the data in the command characteristic 238 to the command buffer 239. (block 850). Appending data in the command characteristic 238 to the command buffer 239 aggregates data transmitted to the meter 114 from the configuration device 117 to build a complete command to be executed by the audience measurement data controller 250 of the example meter 114. Control then proceeds to block 820 where the example command relayer 245 continues to monitor the command characteristic 238 for additional data (e.g., additional portions of a command).

Returning to block 840, if the example command relayer 245 determines that the data stored in the command characteristic 238 is a termination sequence (e.g., block 840 returns result of YES), the example command relayer 245 forwards the command stored in the command buffer 239 to the audience measurement data controller 250 for execution. The audience measurement data controller 250 executes the command (block 860). In response to executing the command, the audience measurement data controller 250 may, for example, create output information to be transmitted back to the configuration device 117. Such output information is monitored by the message monitor 248 as described below in connection with FIG. 9.

The example command relayer 245 then clears the command buffer 239 (block 870). Clearing the command buffer ensures that upon receipt of subsequent termination sequences that the command is not re-executed. Control then proceeds to block 810 where the example communication processor 234 continues to monitor the status of the connection with the configuration device 117. The example process 800 FIG. 8 is then continually repeated to receive commands from the configuration device 117.

Figure 9:
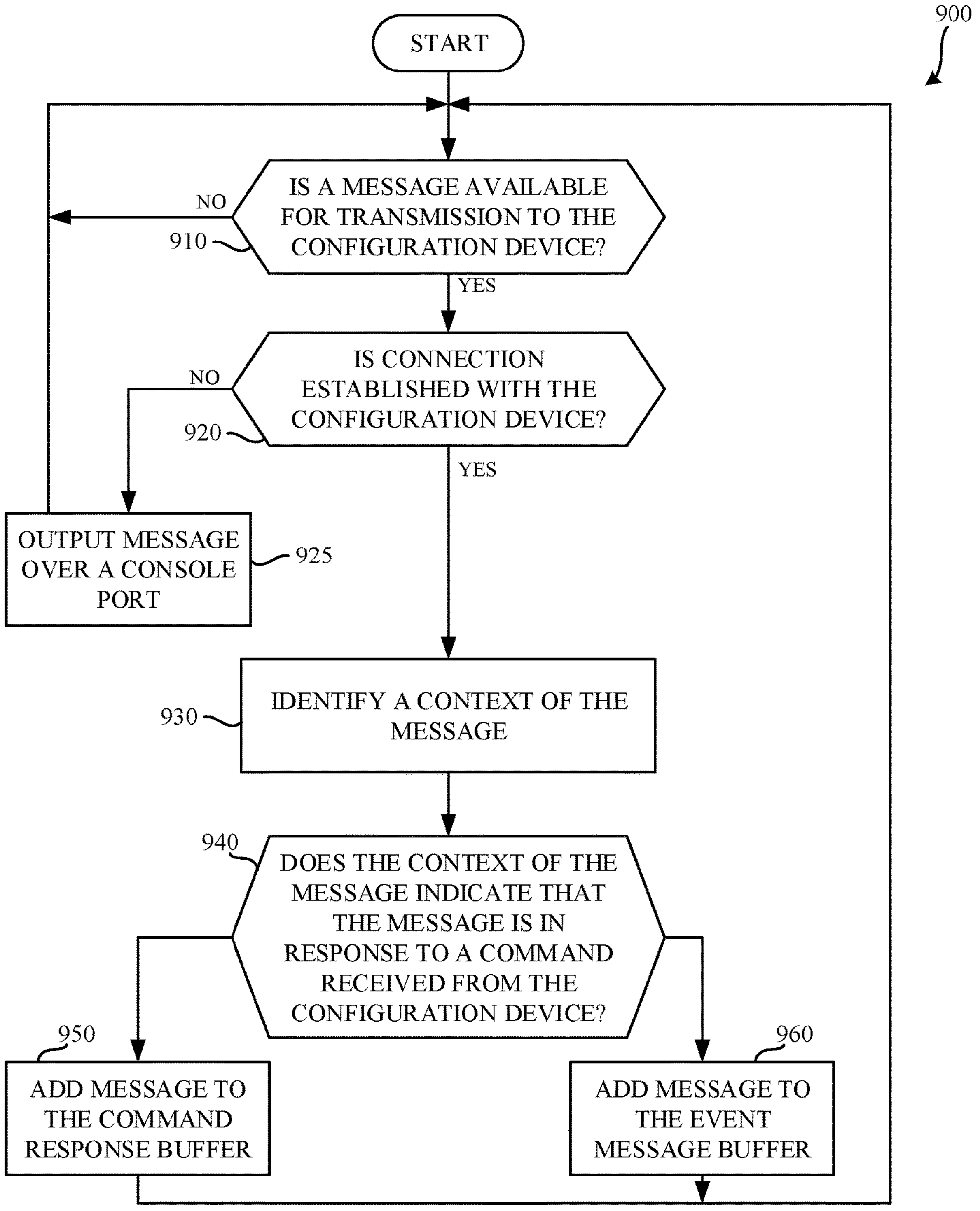
FIG. 9 is a flowchart representative of example machine readable instructions that may be executed to implement the meter of FIGS. 1 and/or 2 to monitor for a message to be sent to the configuration device of FIGS. 1 and/or 3.

FIG. 9 is a flowchart representative of example machine readable instructions that may be executed to implement the meter 114 of FIGS. 1 and/or 2 to monitor for a message to be sent to the configuration device 117 of FIGS. 1 and/or 3. The example process 900 of the illustrated example of FIG. 9 begins when the example message monitor 248 determines whether a message is available for transmission to the configuration device 117 (block 910). In examples disclosed herein, the example message monitor 248 identifies that the message is available for transmission by monitoring and output of the audience measurement data controller 250. However, the example message monitor 248 may determine that a message is available for transmission and any other fashion. For example, the example message monitor 248 may be alerted to the availability of a message by the audience measurement data controller 250 (e.g., an interrupt may be triggered). If no message is available for transmission, (e.g., block 910 returns a result of NO), the example message monitor 248 continues to wait for a message.

If a message is available for transmission (e.g., block 910 returns a result of YES) the example communication processor 234 of the example communication interface 232 determines whether a connection is established with the configuration device 117 (block 920). If no connection is established with the configuration device 117, (e.g., block 920 returns a result of NO), the example communication processor 234 outputs the message over a console port (block 925). In some examples, the meter 114 may include a console port such as for example, a serial port, a USB connection, etc. In examples where the meter 114 is connected to another device using, for example, a console port, outputting the message over the console port (block 925) enables the message to be displayed to a user. Control then proceeds to block 910 where the example message monitor 248 continues to monitor for subsequent messages. (block 910).

If the example communication processor 234 determines that the connection has been established with the example configuration device 117 (e.g., block 920 returns result of YES), the example context determiner 249 identifies a context of the message (block 930). In examples disclosed herein, the example context determiner 249 utilizes a hierarchical state machine to identify the context of the message. Context information concerning messages that are generated by the audience measurement data controller 250 includes information such as, for example, the hierarchical structure of commands and/or instructions that caused the message to be generated. The example context determiner 249 reviews the hierarchical structure to determine whether any of the layers of inheritance of the message identify a command recently issued to the audience measurement data controller 250 by the command relayer 245. However, any other approach to determining a context of a message and/or, more generally, whether the message was in response to a command relayed to the audience measurement data controller 250 may additionally or alternatively be used.

The example context determiner 249 determines whether the context of the message indicates that the message is in response to the command received from the configuration device 117 (block 940). If the example context determiner 249 determines that the context of the message indicates that it is in response to the command, the context determiner 249 adds the message to the example command response buffer 241 (block 950). By adding the message to the command response buffer 241, the message is differentiated from event messages (e.g., messages stored in the event message buffer 243) and, for example, may be displayed in a separate window from the event messages at the configuration device 117.

If the example context determiner 249 determines that the context of the message indicates that the message is not in response to the command, the example context determiner 249 adds the message to the example event message buffer 243 (block 960). Because the message is placed in the event message buffer 243, the message is differentiated from the messages included in the command response buffer 241, and may be displayed in a separate window than the command response messages at the configuration device 117. The example process of FIG. 9 is then repeated to monitor for subsequent messages from the audience measurement data controller 250 and enable those messages to be presented to the user via for example, the configuration device 117.

Figure 10:
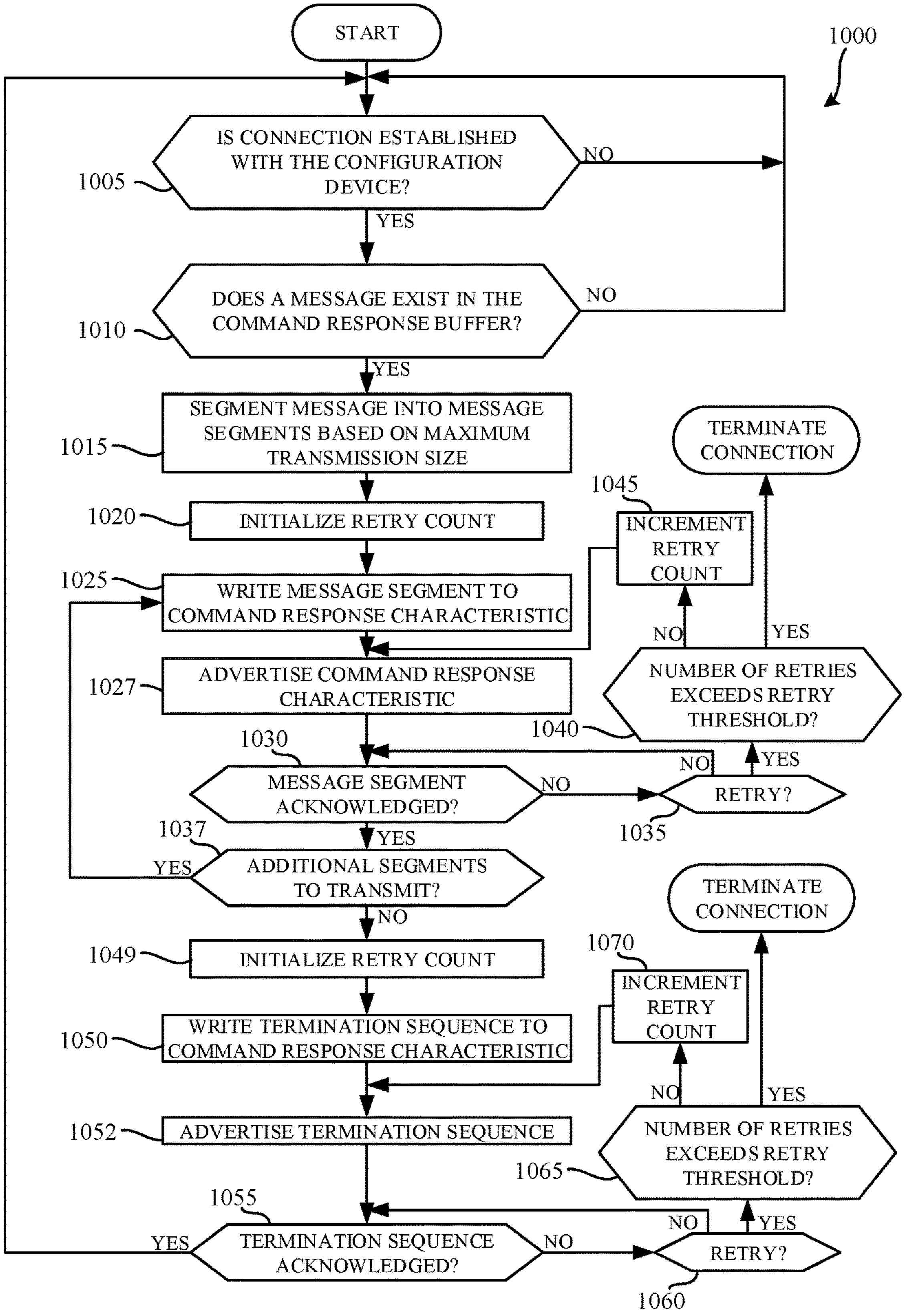
FIG. 10 is a flowchart representative of example machine readable instructions that may be executed to implement the meter of FIGS. 1 and/or 2 to transmit a command response message to the configuration device of FIGS. 1 and/or 3.

FIG. 10 is a flowchart representative of example machine readable instructions that may be executed to implement the meter 114 of FIGS. 1 and/or 2 to transmit a command response message to the configuration device 117 of FIGS. 1 and/or 3. The example process 1000 of the illustrated example of FIG. 10 begins when the example communication processor 234 of the example communication interface 232 determines whether a connection is established with the example configuration device 117 (block 1005). If no connection is established with the configuration device 117 (e.g., block 1005 returns a result of NO), the example communication processor 234 continues to wait for the connection to be established. If the example communication processor 234 determines that a connection has been established with the example configuration device 117 (e.g., block 1005 returns result of YES), the example communication processor 234 determines whether a message exists in the command response buffer 241 (block 1010). Messages may be populated into the command response buffer 241 by, for example, the example context determiner 249 in connection with block 950 of FIG. 9.

If no message exists in the command response buffer 241 (e.g., block 1010 returns a result of NO), the example communication processor 234 continues to determine whether the connection is established (block 1005), and waits for a message to be populated in the command response buffer 241 (block 1010). If a message exists in the command response buffer (e.g., block 1010 returns result of YES), the example communication processor 234 segments the message into message segments based on a maximum transmission size (block 1015). In examples disclosed herein the maximum message transmission size is 20 bytes. However, any other maximum transmission size may additionally or alternatively be used. The example communication processor 234 initializes a retry count. (block 1020). In the illustrated example, the retry count is initialized to zero. However, any other value may additionally or alternatively be used.

The example communication processor 234 stores the message segment in the command response characteristic 240. (block 1025). The example communication processor 234, via the wireless transceiver 233, transmits an advertisement that data is available in the command response characteristic 240. (block 1027). In examples disclosed herein, the advertisement is implemented as an indication using the BLE protocol. However, any other type(s) of advertisement and/or any other notification may additionally or alternatively be used. In examples disclosed herein, the example advertisement includes the message segment stored in the command response characteristic 240. However, in some instructions, the example advertisement may not include the message segment and may, instead, prompt the configuration device 117 to request the information stored in the command response characteristic 240. Upon receipt of the advertisement, the example configuration device 117 will acknowledge the advertisement and/or the message segment stored in the command response characteristic 240.

The example communication processor 234 determines whether the acknowledgment has been received (block 1030). If no acknowledgment has been received (e.g., block 1030 returns result of NO), the example communication processor 234 determines whether a retry is necessary (block 1035). A retry may be necessary when, for example, more than five seconds have elapsed since the advertisement of the message segment in the command response characteristic 240. However, any other time may additionally or alternatively be used. If the example communication processor 234 determines that no retry should be attempted, (e.g., block 1035 returns result of NO), the example communication processor 234 continues to wait for the acknowledgment of the message segment.

If the example communication processor 234 determines that a retry should be attempted (e.g., block 1035 returns a result of YES), the example communication processor 234 determines whether the number of retries exceeds the retry threshold (block 1040). In the illustrated example of FIG. 10, the retry threshold is three attempts. However, any other retry threshold may additionally alternatively be used. If the number of retries does not exceed the retry threshold (e.g., block 1040 returns result of NO), the example communication processor 234 increments the retry count (block 1045), and retransmits the advertisement of the data stored in the command response characteristic 240 (block 1027). If the example communication processor 234 determines that the number of retries exceeds the retry threshold (e.g., block 1040 returns a result of YES), the example communication processor 234 terminates the connection with the configuration device 117. A connection may then be re-established via, for example, the procedures described in the illustrated examples of FIGS. 5 and/or 6.

Returning to block 1030, if the example communication processor 234 determines that the message segment has been acknowledged, the example communication processor 234 determines whether an additional message segment exists to be transmitted (block 1037). If additional message segment exists to be transmitted (e.g., block 1037 returns a result of YES), the example communication processor 234 writes the message segment to the command response characteristic 240 (block 1025), advertises the data in the command response characteristic (block 1027), and awaits an acknowledgment of the message segment (block 1030). The example process of blocks 1025 through 1037 is repeated until there are no additional message segments to be transmitted. In some examples, upon determining that there is an additional segment to transmit, the example configuration controller 360 may additionally re-initialize the retry count (block 1020). Reinitializing the retry count ensures that failures that might occur when attempting to transmit a first segment do not affect transmission of subsequent segments. When receiving subsequent message segments, the example configuration device 117 aggregates the message segments for presentation to the user.

If the example communication processor 234 determines that there are no additional message segments to transmit (e.g., block 1037 returns a result of NO), the example communication processor 234 re-initializes the retry count (block 1049). The example communication processor 234 then writes a termination sequence to the command response characteristic 240 of the example characteristic memory 236 (block 1050). The example communication processor 234 transmits, via the wireless transceiver 233, an advertisement of the termination sequence in the command response characteristic 240. (block 1052). In examples disclosed herein, the example advertisement includes the termination sequence stored in the command response characteristic 240. However, in some examples, the advertisement may not include the termination sequence and may, instead, prompt the configuration device 117 to request the termination sequence stored in the command response characteristic 240. Upon receipt of the advertisement, the example configuration device 117 will acknowledge the advertisement and/or the termination sequence stored in the command response characteristic 240. The example communication processor 234 waits for an acknowledgment of the termination sequence. (block 1055).

If the termination sequence has not been acknowledged (e.g., block 1055 returns result of NO), the example communication processor 234 determines whether a retry is necessary (block 1060). A retry may be necessary when, for example, more than five seconds have elapsed since transmission of the advertisement (block 1052). However, any other time may additionally or alternatively be used. If the example communication processor 234 determines that no retry should be attempted (e.g., block 1060 returns result of NO), the example communication processor 234 continues to wait for the acknowledgment of the termination sequence. If the example communication processor 234 determines that a retry should be attempted (e.g., block 1060 returns a result of YES), the example communication processor 234 determines whether the number of retries exceeds the retry threshold (block 1065). As noted above, the retry threshold of the illustrated example of FIG. 10 is three attempts. However, any other retry threshold may additionally alternatively be used. Moreover, a different retry threshold may be used when attempting to transmit a termination sequence as compared to transmitting a message segment. For example, a larger retry threshold may be used to ensure that more attempts are made to communicate the termination sequence.

If the number of retries does not exceed the retry threshold (e.g., block 1065 returns result of NO), the example communication processor 234 increments the retry count (block 1070), and retransmits the advertisement of the termination sequence. (block 1052). If the example communication processor 234 determines that the number of retries exceeds the retry threshold (e.g., block 1065 returns a result of YES), the example configuration controller 360 terminates the connection with the configuration device 117. A connection may then be reestablished via, for example, the procedures described in the illustrated examples of FIGS. 5 and/or 6.

If the example communication processor 234 determines that the termination sequence has been acknowledged (e.g., block 1055 returns result of YES), control proceeds to block 1005, where the example process 1000 of the illustrated example of FIG. 10 is repeated to continually monitor for and/or transmit messages that are responsive to commands issued to the meter 114 by the configuration device 117.

Figure 11:
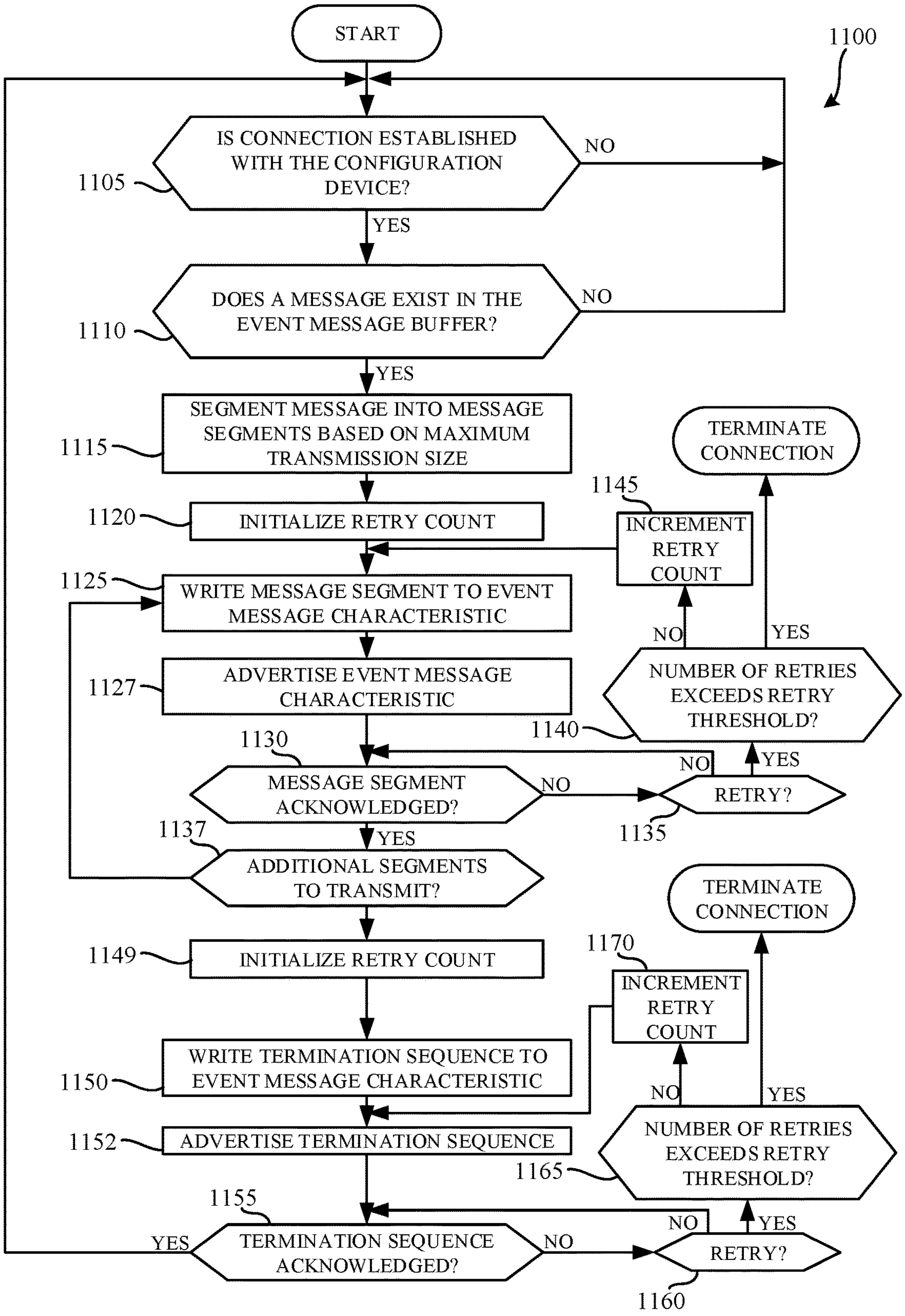
FIG. 11 is a flowchart representative of example machine readable instructions that may be executed to implement the meter of FIGS. 1 and/or 2 to transmit an event message to the configuration device of FIGS. 1 and/or 3.

FIG. 11 is a flowchart representative of example machine readable instructions that may be executed to implement the meter 114 of FIGS. 1 and/or 2 to transmit an event message to the configuration device 117 of FIGS. 1 and/or 3. The example process 1100 of the illustrated example of FIG. 11 begins when the example communication processor 234 of the example communication interface 232 determines whether a connection is established with the example configuration device 117 (block 1105). If no connection is established with the configuration device 117 (e.g., block 1105 returns a result of NO), the example communication processor 234 continues to wait for the connection to be established. If the example communication processor 234 determines that a connection has been established with the example configuration device 117 (e.g., block 1105 returns result of YES), the example communication processor 234 determines whether a message exists in the event message buffer 243 (block 1110). Messages may be populated into the event message buffer 243 by, for example, the example context determiner 249 in connection with block 960 of FIG. 9.

If no message exists in the event message buffer 243 (e.g., block 1110 returns a result of NO), the example communication processor continues to determine whether the connection is established (block 1105), and waits for a message to be populated in the event message buffer 243 (block 1110). If a message exists in the event message buffer (e.g., block 1110 returns result of YES), the example communication processor 234 segments the message into message segments based on a maximum transmission size (block 1115). In examples disclosed herein the maximum message transmission size is 20 bytes. However, any other maximum transmission size may additionally or alternatively be used. The example communication processor 234 initializes a retry count. (block 1120). In the illustrated example, the retry count is initialized to zero. However, any other value may additionally or alternatively be used.

The example communication processor 234 stores the message segment in the event message characteristic 242. (block 1125). The example communication processor 234, via the wireless transceiver 233, transmits an advertisement that data is available in the event message characteristic 242. (block 1127). In examples disclosed herein, the advertisement is implemented as an indication using the BLE protocol. However, any other type(s) of advertisement and/or any other notification may additionally or alternatively be used. In examples disclosed herein, the example advertisement includes the message segment stored in the event message characteristic 242. However, in some instructions, the example advertisement may not include the message segment and may, instead, prompt the configuration device 117 to request the information stored in the event message characteristic 242. Upon receipt of the advertisement, the example configuration device 117 will acknowledge the advertisement and/or the message segment stored in the event message characteristic 242.

The example communication processor 234 determines whether the acknowledgment has been received (block 1130). If no acknowledgment has been received (e.g., block 1130 returns result of NO), the example communication processor 234 determines whether a retry is necessary (block 1135). A retry may be necessary when, for example, more than five seconds have elapsed since the advertisement of the message segment in the event message characteristic 242. However, any other time may additionally or alternatively be used. If the example communication processor 234 determines that no retry should be attempted, (e.g., block 1135 returns result of NO), the example communication processor 234 continues to wait for the acknowledgment of the message segment.

If the example communication processor 234 determines that a retry should be attempted (e.g., block 1135 returns a result of YES), the example communication processor 234 determines whether the number of retries exceeds the retry threshold (block 1140). In the illustrated example of FIG. 11, the retry threshold is three attempts. However, any other retry threshold may additionally alternatively be used. If the number of retries does not exceed the retry threshold (e.g., block 1140 returns result of NO), the example communication processor 234 increments the retry count (block 1145), and retransmits the advertisement of the data stored in the event message characteristic 242 (block 1127). If the example communication processor 234 determines that the number of retries exceeds the retry threshold (e.g., block 1140 returns a result of YES), the example communication processor 234 terminates the connection with the configuration device 117. A connection may then be re-established via, for example, the procedures described in the illustrated examples of FIGS. 5 and/or 6.

Returning to block 1130, if the example communication processor 234 determines that the message segment has been acknowledged, the example communication processor 234 determines whether an additional message segment exists to be transmitted (block 1137). If an additional message segment exists to be transmitted (e.g., block 1137 returns a result of YES), the example communication processor 234 writes the message segment to the event message characteristic 242 (block 1125), advertises the data in the event message characteristic (block 1127), and awaits an acknowledgment of the message segment (block 1130). The example process of blocks 1125 through 1137 is repeated until there are no additional message segments to be transmitted. In some examples, upon determining that there is an additional segment to transmit, the example configuration controller 360 may additionally re-initialize the retry count (block 1120). Reinitializing the retry count ensures that failures that might occur when attempting to transmit a first segment do not affect transmission of subsequent segments. When transmitting subsequent segments, the example configuration device 117 aggregates the event message segments to form a complete message for presentation to the user.

If the example communication processor 234 determines that there are no additional message segments to transmit (e.g., block 1137 returns a result of NO), the example communication processor 234 re-initializes the retry count (block 1149). The example communication processor 234 then writes a termination sequence to the event message characteristic 242 of the example characteristic memory 236 (block 1150). The example communication processor 234 transmits, via the wireless transceiver 233, an advertisement of the termination sequence in the event message characteristic 242. (block 1152). In examples disclosed herein, the example advertisement includes the termination sequence stored in the event message characteristic 242. However, in some instructions, the example advertisement may not include the termination sequence and may, instead, prompt the configuration device 117 to request the termination sequence stored in the event message characteristic 242. Upon receipt of the advertisement, the example configuration device 117 will acknowledge the advertisement and/or the termination sequence stored in the event message characteristic 242. The example communication processor 234 waits for an acknowledgment of the termination sequence. (block 1155).

If the termination sequence has not been acknowledged (e.g., block 1155 returns result of NO), the example communication processor 234 determines whether a retry is necessary (block 1160). A retry may be necessary when, for example, more than five seconds have elapsed since transmission of the advertisement (block 1152). However, any other time may additionally or alternatively be used. If the example communication processor 234 determines that no retry should be attempted (e.g., block 1160 returns result of NO), the example communication processor 234 continues to wait for the acknowledgment of the termination sequence. If the example communication processor 234 determines that a retry should be attempted (e.g., block 1160 returns a result of YES), the example communication processor 234 determines whether the number of retries exceeds the retry threshold (block 1165). As noted above, the retry threshold of the illustrated example of FIG. 11 is three attempts. However, any other retry threshold may additionally alternatively be used. Moreover, a different retry threshold may be used when attempting to transmit a termination sequence as compared to transmitting a message segment. For example, a larger retry threshold may be used to ensure that more attempts are made to communicate the termination sequence.

If the number of retries does not exceed the retry threshold (e.g., block 1165 returns result of NO), the example communication processor 234 increments the retry count (block 1170), and retransmits the advertisement of the termination sequence. (block 1152). If the example communication processor 234 determines that the number of retries exceeds the retry threshold (e.g., block 1165 returns a result of YES), the example configuration controller 360 terminates the connection with the configuration device 117. A connection may then be reestablished via, for example, the procedures described in the illustrated examples of FIGS. 5 and/or 6.

If the example communication processor 234 determines that the termination sequence has been acknowledged (e.g., block 1155 returns a result of YES), control proceeds to block 1105, where the example process 1100 of the illustrated example of FIG. 11 is repeated to continually monitor for and/or transmit messages that are not responsive to commands issued to the meter 114 by the configuration device 117.

FIG. 12 is a flowchart representative of example machine readable instructions that may be executed to implement the configuration device 117 of FIGS. 1 and/or 3 to receive and display a response to a command. The example process 1200 the illustrated example of FIG. 12 begins when the example configuration controller 360 determines whether a connection is established with the meter 114. (block 1210). If no connection is established (e.g., block 1210 returns a result of NO), the example configuration controller 360 waits until connection is established. If the connection is established (e.g., block 1210 returns a result of YES), the example advertisement listener 320 determines whether an advertisement for the command response characteristic 240 has been received. (block 1220). The advertisement for the command response characteristic 240 will be received as a result of an updated command response characteristic being advertised by the meter 114 in connection with blocks 1025 and 1027 of FIG. 10.

If the advertisement listener 320 has not received an advertisement for the command response characteristic 240 (e.g., block 1220 returns a result of NO), the example advertisement listener 320, repeats blocks 1210 and 1220 until the advertisement listener receives an advertisement for the command response characteristic 240 (e.g., until block 1220 returns a result of YES). Upon receipt of the advertisement for the command response (e.g., when block 1220 returns a result of YES), the example configuration controller 360 gathers the information stored in the command response characteristic 240. (block 1230). In some examples, the advertisement message includes the data stored in the command response characteristic 240. However, in some other examples, the configuration controller 360 transmits a request to obtain the data stored in the command response characteristic from the meter 114.

The example command controller 360, in response to gathering the data stored in the command response characteristic 240 acknowledges the data stored in the command response characteristic 240 to the meter 114. (block 1240). Acknowledging the data stored in the command response characteristic 240 to the meter 114 informs the meter 114 that the next segment of data (e.g., a subsequent message, a subsequent portion of a message, etc.) may be written to the command response characteristic 240.

The example command controller 360 determines whether the data that from the command response characteristic 240 is a termination sequence. (block 1245). As noted above, the termination sequence informs the configuration device 117 of the end of a message sequence. If the data from the command response characteristic 240 is the termination sequence (e.g., block 1245 returns a result of YES), the configuration controller 360 outputs a new line to the command response window (e.g., the command response window 420) of the display 370. If the data from the command response characteristic 240 is not the termination sequence (e.g., block 1245 returns a result of NO), the configuration controller 360 outputs the data to the command response window (e.g., the command response window 420) of the display 370. The example process 1200 of FIG. 12 is then repeated to continually output data advertised in the command response characteristic to the command response window.

Figure 13:
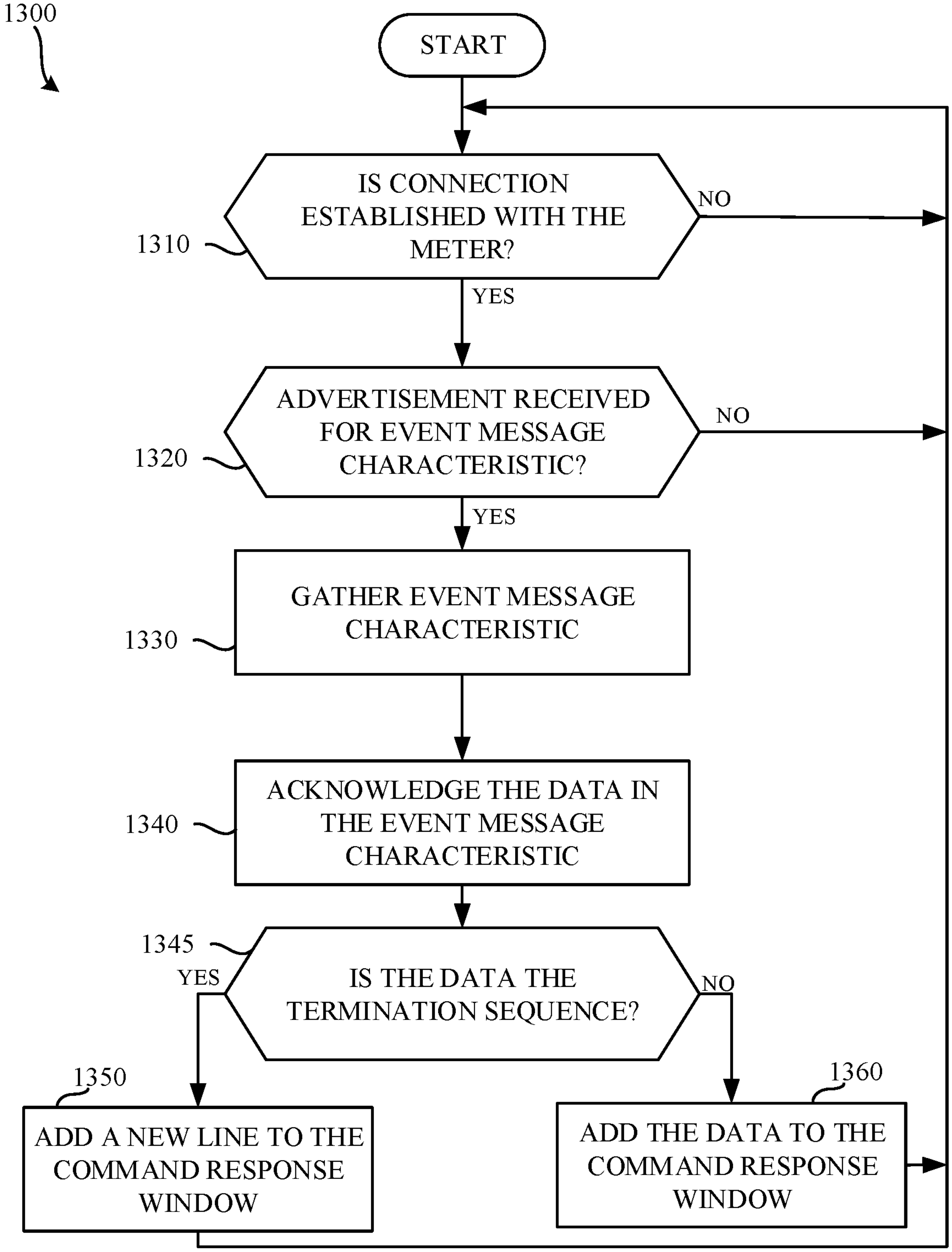
FIG. 13 is a flowchart representative of example machine readable instructions that may be executed to implement the configuration device of FIGS. 1 and/or 3 to receive and display an event message.

FIG. 13 is a flowchart representative of example machine readable instructions that may be executed to implement the configuration device 117 of FIGS. 1 and/or 3 to receive and display an event message. The example process 1300 the illustrated example of FIG. 13 begins when the example configuration controller 360 determines whether a connection is established with the meter 114. (block 1310). If no connection is established (e.g., block 1310 returns a result of NO), the example configuration controller 360 waits until connection is established. If the connection is established (e.g., block 1310 returns a result of YES), the example advertisement listener 320 determines whether an advertisement for the event message characteristic 242 has been received. (block 1320). The advertisement for the event message characteristic 242 will be received as a result of an updated event message characteristic being advertised by the meter 114 in connection with blocks 1125 and 1127 of FIG. 11.

If the advertisement listener 320 has not received an advertisement for the event message characteristic 242 (e.g., block 1320 returns a result of NO), the example advertisement listener 320, blocks 1310 and 1320 are repeated until the advertisement listener receives an advertisement for the event message characteristic 242 (e.g., until block 1320 returns a result of YES). Upon receipt of the advertisement for the event message (e.g., when block 1320 returns a result of YES), the example configuration controller 360 gathers the information stored in the event message characteristic 242. (block 1330). In some examples, the advertisement message includes the data stored in the event message characteristic 242. However, in some other examples, the configuration controller 360 transmits a request to obtain the data stored in the event message characteristic from the meter 114.

The example command controller 360, in response to gathering the data stored in the event message characteristic 242 acknowledges the data stored in the event message characteristic 242 to the meter 114. (block 1340). Acknowledging the data stored in the event message characteristic 242 to the meter 114 informs the meter 114 that the next segment of data (e.g., a subsequent message, a subsequent portion of a message, etc.) may be written to the event message characteristic 242.

The example command controller 360 determines whether the data that from the event message characteristic 242 is a termination sequence. (block 1345). As noted above, the termination sequence informs the configuration device 117 of the end of a message sequence. If the data from the event message characteristic 242 is the termination sequence (e.g., block 1345 returns a result of YES), the configuration controller 360 outputs a new line to the event message window (e.g., the event message window 430) of the display 370. If the data from the event message characteristic 242 is not the termination sequence (e.g., block 1345 returns a result of NO), the configuration controller 360 outputs the data to the event message window (e.g., the event message window 430) of the display 370. The example process 1300 of FIG. 13 is then repeated to continually output data advertised in the event message characteristic to the event message window.

Figure 14:
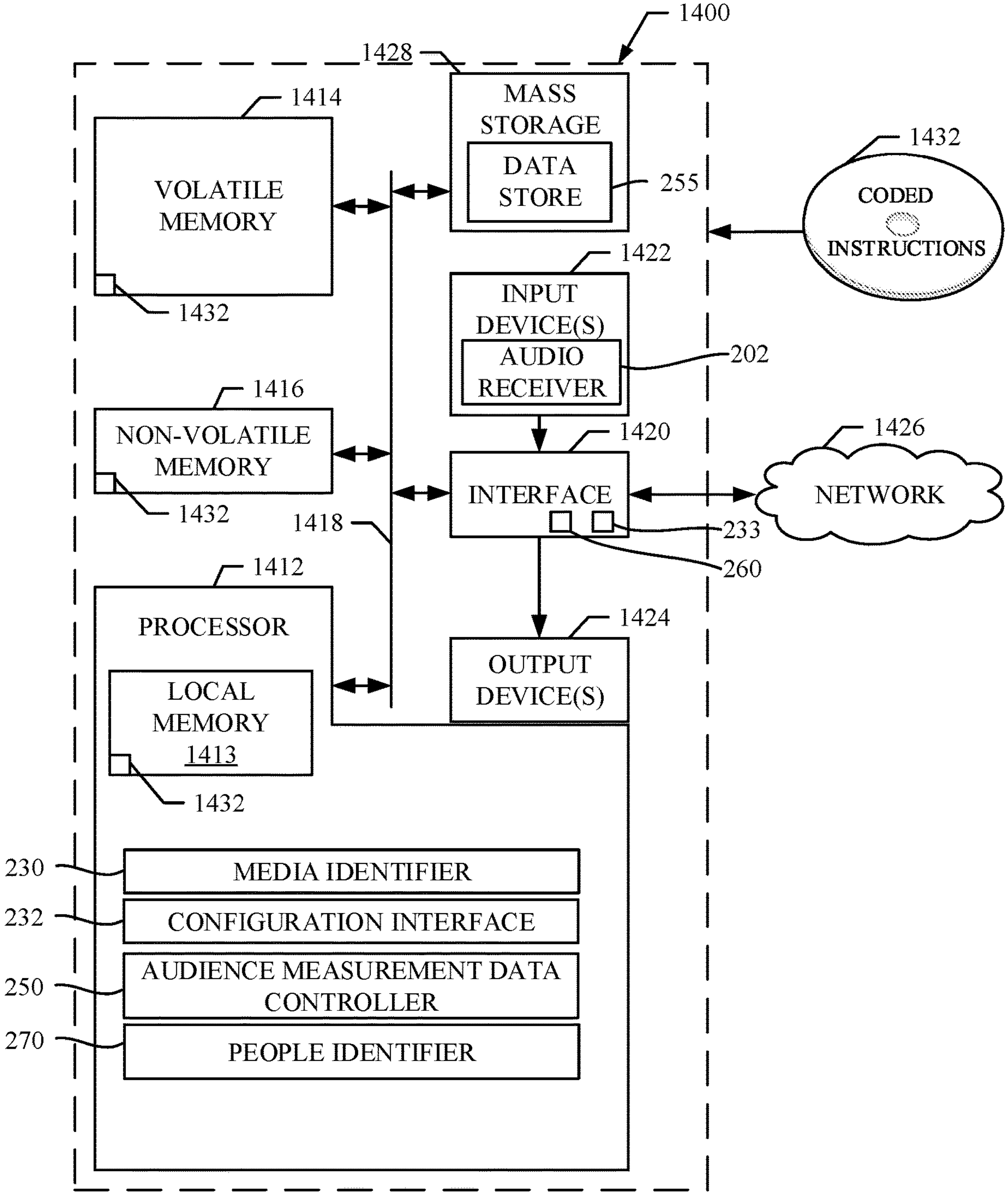
FIG. 14 is a block diagram of an example processor platform capable of executing the machine-readable instructions of FIGS. 5, 8, 9, 10, and/or 11 to implement the example meter of FIGS. 1 and/or 2.

FIG. 14 is a block diagram of an example processor platform 1400 capable of executing the instructions of FIGS. 5, 8, 9, 10, and/or 11 to implement the meter 114 of FIGS. 1 and/or 2. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The example processor 1412 executes instructions to implement the example audio sensor selector 210, the example media identifier 230, the example configuration interface 232, the example audience measurement data controller 250, and/or the example people identifier 270. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. In the illustrated example of FIG. 14, the volatile memory 1414 stores the characteristic memory 236. However, any other memory device of the example processor platform 1400 may additionally or alternatively store the example characteristic memory 236. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 14, the example input device(s) 1422 implement the example audio sensor 202.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 5, 8, 9, 10, and/or 11 may be stored in the mass storage device 1428, in the volatile memory 1414, in the non-volatile memory 1416, and/or on a removable tangible computer readable storage medium such as a CD or DVD. In the illustrated example of FIG. 14, the example mass storage device 1428 stores the data store 255. However, any other memory device of the example processor platform 1400 may additionally or alternatively store the example data store 255.

Figure 15:
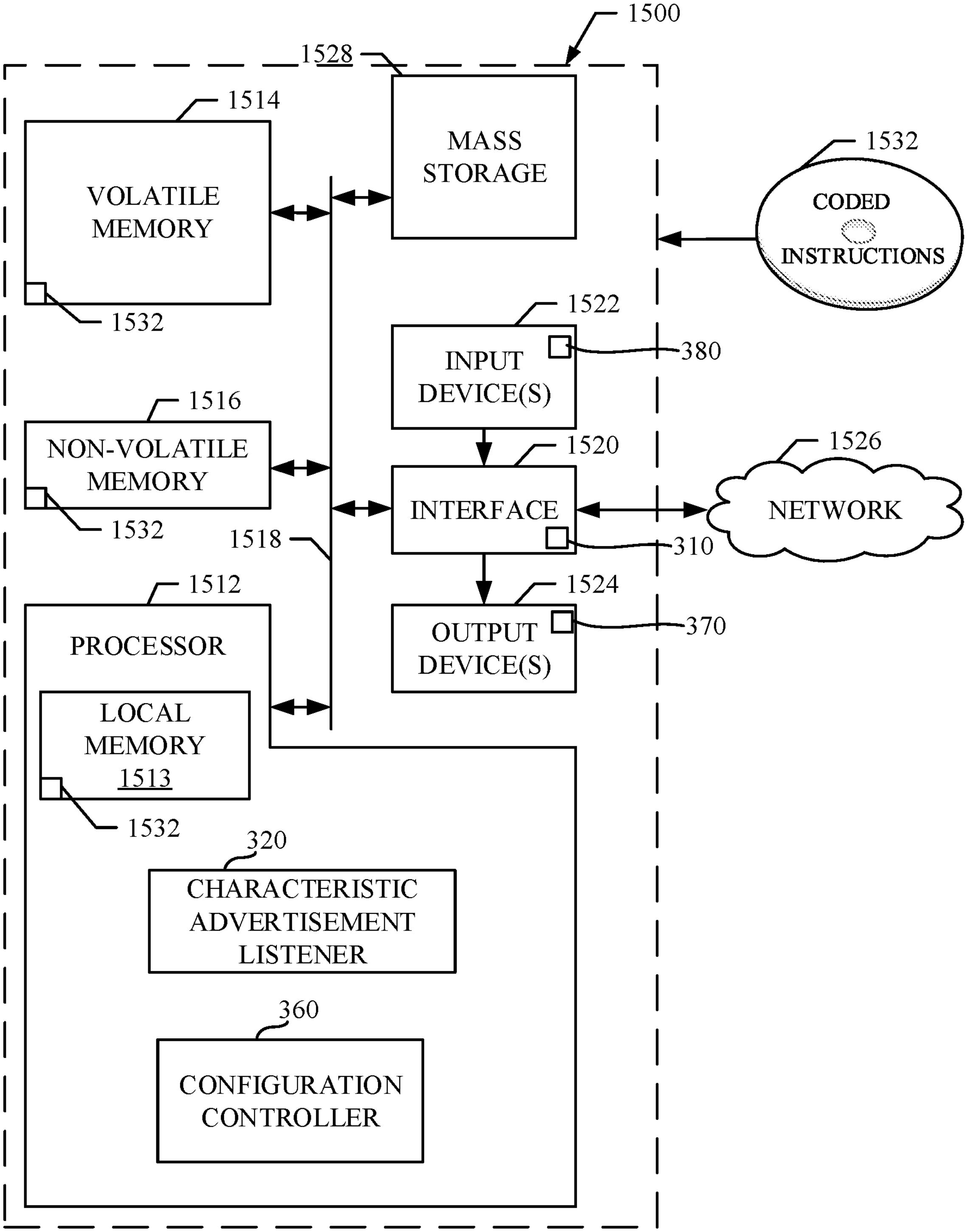
FIG. 15 is a block diagram of an example processor platform capable of executing the machine-readable instructions of FIGS. 6, 7, 12, and/or 13 to implement the example configuration device of FIGS. 1 and/or 3.

FIG. 15 is a block diagram of an example processor platform 1500 capable of executing the instructions of FIGS. 6, 7, 12, and/or 13 to implement the example configuration device 117 of FIGS. 1 and/or 3. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The example processor 1512 executes instructions to implement the example advertisement listener 320 and/or the example configuration controller 360. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 15, the example input device(s) 1522 implement the example user input receiver 380.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor. In the illustrated example of FIG. 15, the example output device(s) 1524 implement the example display 370.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 6, 7, 12, and/or 13 may be stored in the mass storage device 1528, in the volatile memory 1514, in the non-volatile memory 1516, and/or on a removable tangible computer readable storage medium such as a CD or DVD.

From the foregoing, it will be appreciated that the above disclosed methods, apparatus, and articles of manufacture facilitate configuration of an audience measurement device using a wireless communication interface such as, for example, a Bluetooth low energy (BLE) interface. In examples disclosed herein, utilizing the BLE interface results in reduced power requirements of the meter 114. As a result, a meter may utilize a smaller power supply (e.g., batteries) and/or may draw less power from an external power source. Moreover, example approaches disclosed herein utilize context switching to differentiate between messages to be communicated from an audience measurement device (e.g., the meter 114) to a configuration device. Utilizing context switching enables messages that are responsive to a command issued by the configuration device to be transmitted to the configuration device separately from generic event message (e.g., diagnostic messages) that may be generated by the audience measurement device. Context switching facilitates easier use of the configuration device by a user.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An audience measurement meter comprising:

a wireless interface;

one or more processors; and a memory storing instructions that when executed by the one or more processors cause the one or more processors to perform a set of acts comprising:

querying a memory location in a data store of the audience measurement meter to determine a device name of the audience measurement meter, constructing an advertisement data structure that includes the device name, advertising, via the wireless interface, a presence of the audience measurement meter in a panelist household using a short-range wireless protocol, obtaining configuration information for connecting to a wireless network, connecting to the wireless network using the configuration information, causing transmission of meter messages to a configuration device via the short-range wireless protocol, wherein each respective meter message of the meter messages is categorized based on a context of the meter message identified using a hierarchical state machine into either a command response message transmitted via a first characteristic or an event message transmitted via a second characteristic, obtaining media identifying information for media presented in the panelist household, and causing transmission of the media identifying information to a server via the wireless network.

2. The audience measurement meter of claim 1, wherein advertising the presence of the audience measurement meter comprises advertising a connection to the audience measurement meter using the advertisement data structure.

3. The audience measurement meter of claim 1, wherein the set of acts further comprises:

obtaining people monitoring data indicative of an audience exposed to the media presented in the panelist household; and causing transmission of the people monitoring data to a server via the wireless network.

4. The audience measurement meter of claim 3, wherein the wireless network is a WiFi network.

5. The audience measurement meter of claim 4, wherein the set of acts further comprises causing transmission of a communication to the configuration device, the communication to confirm that the audience measurement meter has connected to the internet.

6. The audience measurement meter of claim 4, wherein the set of acts further comprises causing transmission of a communication to the configuration device, the communication to confirm that the audience measurement meter has connected to the wireless network.

7. The audience measurement meter of claim 1, wherein identifying the context of the meter message using the hierarchical state machine comprises analyzing a hierarchical structure of commands that caused the meter message to be generated to determine whether the meter message was generated in response to a command received from the configuration device.

8. A method comprising:

querying a memory location in a data store of an audience measurement meter to determine a device name of the audience measurement meter;

constructing an advertisement data structure that includes the device name;

advertising, via a wireless interface of the audience measurement meter, a presence of the audience measurement meter in a panelist household using a short-range wireless protocol, wherein advertising the presence of the audience measurement meter comprises advertising a connection to the audience measurement meter using the advertisement data structure;

obtaining, by the audience measurement meter, configuration information for connecting to a wireless network;

connecting, by the audience measurement meter, to the wireless network using the configuration information;

causing transmission of meter messages to the configuration device via the short-range wireless protocol, wherein each respective meter message of the meter messages is categorized based on a context of the meter message identified using a hierarchical state machine into either a command response message transmitted via a first characteristic or an event message transmitted via a second characteristic;

obtaining, by the audience measurement meter, media identifying information for media presented in the panelist household; and causing, by the audience measurement meter, transmission of the media identifying information to a server via the wireless network.

9. The method of claim 8, wherein advertising the presence of the audience measurement meter comprises advertising a connection to the audience measurement meter using the advertisement data structure.

10. The method of claim 8, further comprising:

obtaining people monitoring data indicative of an audience exposed to the media presented in the panelist household; and causing transmission of the people monitoring data to a server via the wireless network.

11. The method of claim 10, wherein the wireless network is a WiFi network.

12. The method of claim 11, further comprising causing transmission of a communication to the configuration device, the communication to confirm that the audience measurement meter has connected to the internet.

13. The method of claim 11, further comprising causing transmission of a communication to the configuration device, the communication to confirm that the audience measurement meter has connected to the wireless network.

14. The method of claim 8, wherein identifying the context of the meter message using the hierarchical state machine comprises analyzing a hierarchical structure of commands that caused the meter message to be generated to determine whether the meter message was generated in response to a command received from the configuration device.

15. A non-transitory computer-readable medium having stored thereon instructions that when executed by an audience measurement meter cause the audience measurement meter to perform a set of acts comprising:

querying a memory location in a data store of the audience measurement meter to determine a device name of the audience measurement meter;

constructing an advertisement data structure that includes the device name, advertising, via a wireless interface of the audience measurement meter, a presence of the audience measurement meter in a panelist household using a short-range wireless protocol;

obtaining configuration information for connecting to a wireless network;

connecting to the wireless network using the configuration information;

causing transmission of meter messages to the configuration device via the short-range wireless protocol, wherein each respective meter message of the meter messages is categorized based on a context of the meter message identified using a hierarchical state machine into either a command response message transmitted via a first characteristic or an event message transmitted via a second characteristic;

obtaining media identifying information for media presented in the panelist household; and causing transmission of the media identifying information to a server via the wireless network.

16. The non-transitory computer-readable medium of claim 15, wherein advertising the presence of the audience measurement meter comprises advertising a connection to the audience measurement meter using the advertisement data structure.

17. The non-transitory computer-readable medium of claim 15, wherein the set of acts further comprises:

obtaining people monitoring data indicative of an audience exposed to the media presented in the panelist household; and causing transmission of the people monitoring data to a server via the wireless network.

18. The non-transitory computer-readable medium of claim 15, wherein the set of acts further comprises obtaining media identifying information for the media.

19. The non-transitory computer-readable medium of claim 15, wherein the set of acts further comprises causing transmission of a communication to the configuration device, the communication to confirm that the audience measurement meter has connected to the internet.

20. The non-transitory computer-readable medium of claim 15, wherein identifying the context of the meter message using the hierarchical state machine comprises analyzing a hierarchical structure of commands that caused the meter message to be generated to determine whether the meter message was generated in response to a command received from the configuration device.

* * * * *